US006990821B2

(12) United States Patent
Singh et al.

(10) Patent No.: US 6,990,821 B2
(45) Date of Patent: Jan. 31, 2006

(54) MODEL-BASED ALARMING

(75) Inventors: Abtar Singh, Kennesaw, GA (US);
Paul Wickberg, Marietta, GA (US);
Neal Starling, Canton, GA (US);
Thomas J. Mathews, Fayette, ME (US)

(73) Assignee: Emerson Retail Services Inc.,
Kennesaw, GA (US)

( * ) Notice: Subject to any disclaimer, the term of this patent is extended or adjusted under 35 U.S.C. 154(b) by 80 days.

(21) Appl. No.: 10/698,048

(22) Filed: Oct. 30, 2003

(65) Prior Publication Data

US 2004/0159113 A1 Aug. 19, 2004

Related U.S. Application Data

(63) Continuation of application No. PCT/US02/13459, filed on Apr. 29, 2002.
(60) Provisional application No. 60/288,551, filed on May 3, 2001.

(51) Int. Cl.
*G01K 17/06* (2006.01)
(52) U.S. Cl. ............................. 62/129; 62/230; 236/94
(58) Field of Classification Search ................. 62/125, 62/126, 127, 129, 130, 230; 236/51, 94; 165/11.1
See application file for complete search history.

(56) References Cited

U.S. PATENT DOCUMENTS

| 4,325,223 A | 4/1982 | Cantley |
| 4,611,470 A | 9/1986 | Enstrom |
| 4,768,346 A | 9/1988 | Mathur |
| 5,555,195 A | 9/1996 | Jensen et al. |

FOREIGN PATENT DOCUMENTS

JP 62-116844 5/1987

OTHER PUBLICATIONS

International Search Report for PCT/US02/13459; ISA/US; date mailed Sep. 19, 2002.

*Primary Examiner*—Harry B. Tanner
(74) *Attorney, Agent, or Firm*—Harness, Dickey & Pierce, P.L.C.

(57) ABSTRACT

A system and method for managing energy consumption of a building system includes a source of actual energy consumption data, a source of actual weather data, and a database correlating discrete weather data values with expected energy consumption values for at least one component of the building system. A computer accesses the actual weather data, actual energy consumption data and database, wherein the computer compares the expected energy consumption values with actual energy consumption data and generates an output based on the comparison. The expected energy consumption values are generated for the discrete weather data values using an energy consumption model that functionally relates discrete weather data values and design information for the building system component.

24 Claims, 24 Drawing Sheets

| Ashrae Data for 72 Cities In Degrees F | | WORKING PAGE, DO NOT CHANGE | | | | | | | | | | | | | |
|---|---|---|---|---|---|---|---|---|---|---|---|---|---|---|---|
| # bins | 24 | | | | | | | | | | | | | | |
| bin size | 7F | | | | | | | | | | | | | | |
| top range | 127F | | | | | | | | | | | | | | |
| typical year through 1998 | | | | | | | | | | | | | | | |
| Each bin range extends from the temperature shown to the bottom of the next higher range. The bottom and top bins are open ended eg. 126.5 to 99999 | | | | | | | | | | | | | | | |
| | | ABEDMNTW.WY2 | | ALBIRMNW.WY2 | | ARLROCKW.WY2 | | AZPHNIXT.WY2 | | AZPHNIXW.WY2 | | BCVANCVW.WY2 | | CAFRESNT.WY2 | |
| | | Edmonton, Alberta | | (Birmingha Alabama) | | (Little Rock, | | (Phoenix, Arizona) | | (Phoenix, Arizona) | | (Vancouver British | | (Fresno, California) | |
| | | 53.55 | | 33.57 | -86.75 | 34.73 | -92.23 | 33.43 | -112.02 | 33.43 | -112.02 | 49.2 | -123.18 | 36.77 | -119.72 |
| Month | Bin Temp | DryBulb | WetBulb | DryBulb | WetBulb | DryBulb | WetBulb | DryBulb | WetBulb | DryBulb | WetBulb | DryBulb | WetBulb | DryBulb | WetBulb |
| Jan | 126 | 0 | 0 | 0 | 0 | 0 | 0 | 0 | 0 | 0 | 2 | 0 | 0 | 0 | 0 |
| Jan | 120 | 0 | 0 | 0 | 0 | 0 | 0 | 0 | 0 | 0 | 0 | 0 | 0 | 0 | 0 |
| Jan | 113 | 0 | 0 | 0 | 0 | 0 | 0 | 0 | 0 | 0 | 0 | 0 | 0 | 0 | 0 |
| Jan | 107 | 0 | 0 | 0 | 0 | 0 | 0 | 0 | 0 | 0 | 0 | 0 | 0 | 0 | 0 |
| Jan | 100 | 0 | 0 | 0 | 0 | 0 | 0 | 0 | 1 | 0 | 0 | 0 | 0 | 0 | 0 |
| Jan | 94 | 0 | 0 | 0 | 0 | 0 | 0 | 0 | 0 | 0 | 0 | 0 | 0 | 0 | 0 |
| Jan | 87 | 0 | 0 | 0 | 0 | 0 | 0 | 0 | 0 | 0 | 0 | 0 | 0 | 0 | 0 |
| Jan | 81 | 0 | 0 | 0 | 0 | 0 | 0 | 0 | 0 | 0 | 0 | 0 | 0 | 0 | 0 |
| Jan | 74 | 0 | 0 | 0 | 0 | 0 | 0 | 0 | 0 | 3 | 0 | 0 | 0 | 0 | 0 |
| Jan | 68 | 0 | 0 | 0 | 0 | 4 | 0 | 27 | 1 | 45 | 5 | 0 | 2 | 1 | 0 |
| Jan | 61 | 0 | 10 | 37 | 17 | 51 | 16 | 113 | 4 | 108 | 4 | 0 | 0 | 47 | 5 |
| Jan | 55 | 0 | 45 | 115 | 57 | 71 | 63 | 178 | 17 | 134 | 95 | 52 | 16 | 103 | 14 |
| Jan | 48 | 0 | 114 | 148 | 82 | 52 | 46 | 160 | 151 | 131 | 317 | 208 | 122 | 304 | 288 |
| Jan | 42 | 0 | 149 | 133 | 154 | 142 | 86 | 145 | 304 | 213 | 198 | 161 | 219 | 196 | 323 |
| Jan | 35 | 8 | 134 | 107 | 143 | 126 | 154 | 92 | 202 | 71 | 82 | 135 | 120 | 84 | 99 |
| Jan | 29 | 24 | 79 | 78 | 117 | 108 | 137 | 29 | 61 | 25 | 34 | 153 | 186 | 9 | 15 |
| Jan | 22 | 85 | 121 | 82 | 112 | 100 | 113 | 0 | 1 | 14 | 6 | 35 | 78 | 0 | 0 |
| Jan | 16 | 70 | 52 | 37 | 54 | 64 | 89 | 0 | 0 | 0 | 0 | 0 | 1 | 0 | 0 |
| Jan | 9 | 69 | 39 | 7 | 8 | 26 | 33 | 0 | 0 | 0 | 0 | 0 | 0 | 0 | 0 |
| Jan | 3 | 72 | 1 | 0 | 0 | 0 | 7 | 0 | 0 | 0 | 1 | 0 | 0 | 0 | 0 |
| Jan | -4 | 84 | 0 | 0 | 0 | 0 | 0 | 0 | 0 | 0 | 0 | 0 | 0 | 0 | 0 |
| Jan | -10 | 184 | 0 | 0 | 0 | 0 | 0 | 0 | 0 | 0 | 0 | 0 | 0 | 0 | 0 |
| Jan | -17 | 63 | 0 | 0 | 0 | 0 | 0 | 0 | 0 | 0 | 0 | 0 | 0 | 0 | 0 |
| Jan | -23 | 85 | 0 | 0 | 0 | 0 | 0 | 0 | 0 | 0 | 0 | 0 | 0 | 0 | 0 |
| Feb | 126 | 0 | 0 | 0 | 0 | 0 | 0 | 0 | 0 | 0 | 0 | 0 | 0 | 0 | 0 |
| Feb | 120 | 0 | 0 | 0 | 0 | 0 | 0 | 0 | 0 | 0 | 0 | 0 | 0 | 0 | 0 |
| Feb | 113 | 0 | 0 | 0 | 0 | 0 | 0 | 0 | 0 | 0 | 0 | 0 | 0 | 0 | 0 |
| Feb | 107 | 0 | 0 | 0 | 0 | 0 | 0 | 0 | 0 | 0 | 0 | 0 | 0 | 0 | 0 |
| Feb | 100 | 0 | 0 | 0 | 0 | 0 | 0 | 0 | 0 | 0 | 0 | 0 | 0 | 0 | 0 |
| Feb | 94 | 0 | 0 | 0 | 0 | 0 | 0 | 0 | 0 | 0 | 0 | 0 | 0 | 0 | 0 |
| Feb | 87 | 0 | 0 | 0 | 0 | 0 | 0 | 0 | 0 | 0 | 0 | 0 | 0 | 0 | 0 |
| Feb | 81 | 0 | 0 | 0 | 0 | 0 | 0 | 0 | 0 | 0 | 0 | 0 | 0 | 0 | 0 |
| Feb | 74 | 0 | 1 | 4 | 0 | 0 | 0 | 2 | 0 | 3 | 0 | 0 | 0 | 1 | 0 |
| Feb | 68 | 0 | 0 | 19 | 71 | 15 | 3 | 13 | 2 | 8 | 1 | 0 | 0 | 10 | 0 |
| Feb | 61 | 0 | 4 | 92 | 73 | 33 | 13 | 52 | 1 | 65 | 1 | 0 | 1 | 41 | 1 |
| Feb | 55 | 0 | 71 | 106 | 53 | 54 | 33 | 105 | 6 | 91 | 88 | 0 | 0 | 108 | 42 |
| Feb | 48 | 0 | 77 | 90 | 130 | 89 | 72 | 141 | 115 | 166 | 169 | 18 | 167 | 224 | 185 |
| Feb | 42 | 0 | 156 | 125 | 122 | 206 | 139 | 130 | 294 | 152 | 246 | 313 | 1 | 170 | 275 |
| Feb | 35 | 22 | 99 | 73 | 100 | 104 | 179 | 156 | 201 | 152 | 152 | 244 | 376 | 74 | 105 |
| Feb | 29 | 73 | 101 | 99 | | 101 | 121 | 68 | | 28 | | 92 | 122 | 44 | 58 |

*Figure 8*

WYEC-2 site   NMALBUQW.WY2 (Albuquerque, New Mexico)
Latitude:   35.05   Longitude:   -106.62 quantity   WYEC2 wetbulb

| | | | | | | | | | | | | | | | | |
|---|---|---|---|---|---|---|---|---|---|---|---|---|---|---|---|---|
| 0 | 0 | 0 | 2 | 22 | 80 | 248 | 270 | 120 | 2 | 0 | 0 | 0 | 0 | 0 | 0 | 744 |
| 0 | 0 | 0 | 0 | 43 | 42 | 116 | 156 | 204 | 99 | 9 | 0 | 3 | 0 | 0 | 0 | 672 |
| 0 | 0 | 0 | 3 | 0 | 14 | 143 | 232 | 255 | 96 | 0 | 0 | 1 | 0 | 0 | 0 | 744 |
| 0 | 1 | 0 | 0 | 2 | 2 | 41 | 115 | 228 | 232 | 83 | 10 | 1 | 0 | 0 | 0 | 720 |
| 0 | 2 | 0 | 0 | 0 | 0 | 0 | 21 | 89 | 283 | 263 | 71 | 6 | 1 | 0 | 0 | 744 |
| 0 | 2 | 0 | 0 | 0 | 0 | 0 | 5 | 23 | 134 | 199 | 268 | 81 | 6 | 1 | 0 | 720 |
| 0 | 0 | 0 | 0 | 0 | 0 | 4 | 0 | 0 | 6 | 12 | 382 | 318 | 19 | 2 | 1 | 744 |
| 0 | 2 | 0 | 1 | 0 | 0 | 1 | 1 | 2 | 20 | 82 | 280 | 343 | 0 | 2 | 0 | 744 |
| 0 | 0 | 0 | 0 | 0 | 0 | 0 | 4 | 13 | 158 | 218 | 300 | 20 | 14 | 0 | 0 | 720 |
| 0 | 1 | 0 | 0 | 7 | 37 | 147 | 198 | 89 | 276 | 265 | 103 | 6 | 0 | 1 | 0 | 744 |
| 2 | 0 | 0 | 0 | 28 | 62 | 210 | 195 | 172 | 141 | 12 | 0 | 1 | 0 | 0 | 0 | 720 |
| 0 | 0 | 0 | 0 | 102 | 237 | 913 | 1201 | 209 | 37 | 0 | 0 | 0 | 0 | 0 | 0 | 744 |
| 12 | 9 | 9 | 3 | | | | | 1404 | 1484 | 1143 | 1414 | 780 | 33 | 4 | 4 | 1 | 8760 |

| kwmonth | ACTUAL DAY BY DAY, HOUR BY HOUR DATA<br>Data must be sorted by date and hour | | | | | | ACTUAL DAY BY DAY, HOUR BY HOUR DATA FOR 24 HOUR PERIOD | | | | | |
|---|---|---|---|---|---|---|---|---|---|---|---|---|
| | kwdate | kwhour | temp | kwuselt | kwusemt | Storepop | kwdate | kwhour | temp | kwuselt | kwusemt | Storepop |
| 1 | 01/18/01 | 1.0 | 44.8 | 40.8 | 43.0 | 2.0 | 01/18/01 | 1 | 39 | 39 | 43 | 2 |
| 1 | 01/18/01 | 2.0 | 44.8 | 40.8 | 43.0 | 2.0 | 01/18/01 | 2 | 39 | 39 | 43 | 2 |
| 1 | 01/18/01 | 3.0 | 44.8 | 40.8 | 43.0 | 2.0 | 01/18/01 | 3 | 39 | 39 | 43 | 2 |
| 1 | 01/18/01 | 4.0 | 44.8 | 40.8 | 43.0 | 2.0 | 01/18/01 | 4 | 39 | 39 | 43 | 2 |
| 1 | 01/18/01 | 5.0 | 44.8 | 40.8 | 43.0 | 2.0 | 01/18/01 | 5 | 39 | 39 | 43 | 2 |
| 1 | 01/18/01 | 6.0 | 44.8 | 40.8 | 43.0 | 2.0 | 01/18/01 | 6 | 39 | 39 | 43 | 2 |
| 1 | 01/18/01 | 7.0 | 44.8 | 40.8 | 43.0 | 2.0 | 01/18/01 | 7 | 39 | 39 | 43 | 2 |
| 1 | 01/18/01 | 8.0 | 44.8 | 40.8 | 43.0 | 2.0 | 01/18/01 | 8 | 39 | 39 | 43 | 2 |
| 1 | 01/18/01 | 9.0 | 44.8 | 40.8 | 43.0 | 2.0 | 01/18/01 | 9 | 39 | 39 | 43 | 2 |
| 1 | 01/18/01 | 10.0 | 44.8 | 40.8 | 43.0 | 2.0 | 01/18/01 | 10 | 39 | 39 | 43 | 2 |
| 1 | 01/18/01 | 11.0 | 44.8 | 40.8 | 43.0 | 2.0 | 01/18/01 | 11 | 39 | 39 | 43 | 2 |
| 1 | 01/18/01 | 12.0 | 44.8 | 40.8 | 43.0 | 2.0 | 01/18/01 | 12 | 39 | 39 | 43 | 2 |
| 1 | 01/18/01 | 13.0 | 44.8 | 40.8 | 43.0 | 2.0 | 01/18/01 | 13 | 39 | 39 | 43 | 2 |
| 1 | 01/18/01 | 14.0 | 44.8 | 40.8 | 43.0 | 2.0 | 01/18/01 | 14 | 39 | 39 | 43 | 2 |
| 1 | 01/18/01 | 15.0 | 44.8 | 40.8 | 43.0 | 2.0 | 01/18/01 | 15 | 39 | 39 | 43 | 2 |
| 1 | 01/18/01 | 16.0 | 44.8 | 40.8 | 43.0 | 2.0 | 01/18/01 | 16 | 39 | 39 | 43 | 2 |
| 1 | 01/18/01 | 17.0 | 44.8 | 40.8 | 43.0 | 2.0 | 01/18/01 | 17 | 39 | 39 | 43 | 2 |
| 1 | 01/18/01 | 18.0 | 44.8 | 40.8 | 43.0 | 2.0 | 01/18/01 | 18 | 39 | 39 | 43 | 2 |
| 1 | 01/18/01 | 19.0 | 44.8 | 40.8 | 43.0 | 2.0 | 01/18/01 | 19 | 39 | 39 | 43 | 2 |
| 1 | 01/18/01 | 20.0 | 44.8 | 40.8 | 43.0 | 2.0 | 01/18/01 | 20 | 39 | 39 | 43 | 2 |
| 1 | 01/18/01 | 21.0 | 44.8 | 40.8 | 43.0 | 2.0 | 01/18/01 | 21 | 39 | 39 | 43 | 2 |
| 1 | 01/18/01 | 22.0 | 44.8 | 40.8 | 43.0 | 2.0 | 01/18/01 | 22 | 39 | 39 | 43 | 2 |
| 1 | 01/18/01 | 23.0 | 44.8 | 40.8 | 43.0 | 2.0 | 01/18/01 | 23 | 39 | 39 | 43 | 2 |
| 1 | 01/18/01 | 0.0 | 44.8 | 40.8 | 43.0 | 2.0 | 01/19/01 | 0 | 39 | 16 | 42 | 2 |

Figure 13

GENERAL MODEL CALCULATIONS
LOW and MEDIUM TEMP RACK kWh Use for Each Bin Hour

| Amb Temp | Cond T Temp | Subcooler T Tin | Subcooler T Tout | Suct T....-25F Base Load....281,332 Comp Eff 65% s.c. load | comp load | Comp KW | Suct T....-35F Base Load....13,580 Comp Eff 65% s.c. load | comp load | Comp KW | Suct T....15F Base Load.... Comp Eff 65% s.c. load | comp load | Comp KW | Total Comp KW | Condenser Calculations Heat of Rejection (Btu/hr) | req. cap. | fan KW | Annual Energy Comp kWh | Cond kWh | Total kWh |
|---|---|---|---|---|---|---|---|---|---|---|---|---|---|---|---|---|---|---|---|
| -25 | 55.5285 | 40.5 | 40.5 | · | 281,332 | 27.76 | · | 13,580 | 1.58 | · | · | · | 29.34 | 395,006 | 27% | 0.35 | 29 | 0.35 | 30 |
| -24 | 55.5285 | 40.5 | 40.5 | · | 281,332 | 27.76 | · | 13,580 | 1.58 | · | · | · | 29.34 | 395,006 | 28% | 0.35 | 29 | 0.35 | 30 |
| -23 | 55.5285 | 40.5 | 40.5 | · | 281,332 | 27.76 | · | 13,580 | 1.58 | · | · | · | 29.34 | 395,006 | 28% | 0.35 | 29 | 0.35 | 30 |
| -22 | 55.5285 | 40.5 | 40.5 | · | 281,332 | 27.76 | · | 13,580 | 1.58 | · | · | · | 29.34 | 395,006 | 28% | 0.36 | 29 | 0.36 | 30 |
| -21 | 55.5285 | 40.5 | 40.5 | · | 281,332 | 27.76 | · | 13,580 | 1.58 | · | · | · | 29.34 | 395,006 | 29% | 0.36 | 29 | 0.36 | 30 |
| -20 | 55.5285 | 40.5 | 40.5 | · | 281,332 | 27.76 | · | 13,580 | 1.58 | · | · | · | 29.34 | 395,006 | 29% | 0.37 | 29 | 0.37 | 30 |
| -19 | 55.5285 | 40.5 | 40.5 | · | 281,332 | 27.76 | · | 13,580 | 1.58 | · | · | · | 29.34 | 395,006 | 29% | 0.37 | 29 | 0.37 | 30 |
| -18 | 55.5285 | 40.5 | 40.5 | · | 281,332 | 27.76 | · | 13,580 | 1.58 | · | · | · | 29.34 | 395,006 | 30% | 0.38 | 29 | 0.38 | 30 |
| -17 | 55.5285 | 40.5 | 40.5 | · | 281,332 | 27.76 | · | 13,580 | 1.58 | · | · | · | 29.34 | 395,006 | 30% | 0.38 | 29 | 0.38 | 30 |
| -16 | 55.5285 | 40.5 | 40.5 | · | 281,332 | 27.76 | · | 13,580 | 1.58 | · | · | · | 29.34 | 395,006 | 31% | 0.39 | 29 | 0.39 | 30 |
| -15 | 55.5285 | 40.5 | 40.5 | · | 281,332 | 27.76 | · | 13,580 | 1.58 | · | · | · | 29.34 | 395,006 | 31% | 0.39 | 29 | 0.39 | 30 |
| -14 | 55.5285 | 40.5 | 40.5 | · | 281,332 | 27.76 | · | 13,580 | 1.58 | · | · | · | 29.34 | 395,006 | 32% | 0.40 | 29 | 0.40 | 30 |
| -13 | 55.5285 | 40.5 | 40.5 | · | 281,332 | 27.76 | · | 13,580 | 1.58 | · | · | · | 29.34 | 395,006 | 32% | 0.41 | 29 | 0.41 | 30 |
| -12 | 55.5285 | 40.5 | 40.5 | · | 281,332 | 27.76 | · | 13,580 | 1.58 | · | · | · | 29.34 | 395,006 | 32% | 0.41 | 29 | 0.41 | 30 |
| -11 | 55.5285 | 40.5 | 40.5 | · | 281,332 | 27.76 | · | 13,580 | 1.58 | · | · | · | 29.34 | 395,006 | 33% | 0.42 | 29 | 0.42 | 30 |
| -10 | 55.5285 | 40.5 | 40.5 | · | 281,332 | 27.76 | · | 13,580 | 1.58 | · | · | · | 29.34 | 395,006 | 33% | 0.42 | 29 | 0.42 | 30 |
| -9 | 55.5285 | 40.5 | 40.5 | · | 281,332 | 27.76 | · | 13,580 | 1.58 | · | · | · | 29.34 | 395,006 | 34% | 0.43 | 29 | 0.43 | 30 |
| -8 | 55.5285 | 40.5 | 40.5 | · | 281,332 | 27.76 | · | 13,580 | 1.58 | · | · | · | 29.34 | 395,006 | 35% | 0.44 | 29 | 0.44 | 30 |
| -7 | 55.5285 | 40.5 | 40.5 | · | 281,332 | 27.76 | · | 13,580 | 1.58 | · | · | · | 29.34 | 395,006 | 35% | 0.45 | 29 | 0.45 | 30 |
| -6 | 55.5285 | 40.5 | 40.5 | · | 281,332 | 27.76 | · | 13,580 | 1.58 | · | · | · | 29.34 | 395,006 | 36% | 0.45 | 29 | 0.45 | 30 |
| -5 | 55.5285 | 40.5 | 40.5 | · | 281,332 | 27.76 | · | 13,580 | 1.58 | · | · | · | 29.34 | 395,006 | 36% | 0.46 | 29 | 0.46 | 30 |
| -4 | 55.5285 | 40.5 | 40.5 | · | 281,332 | 27.76 | · | 13,580 | 1.58 | · | · | · | 29.34 | 395,006 | 37% | 0.47 | 29 | 0.47 | 30 |
| -3 | 55.5285 | 40.5 | 40.5 | · | 281,332 | 27.76 | · | 13,580 | 1.58 | · | · | · | 29.34 | 395,006 | 37% | 0.48 | 29 | 0.48 | 30 |
| -2 | 55.5285 | 40.5 | 40.5 | · | 281,332 | 27.76 | · | 13,580 | 1.58 | · | · | · | 29.34 | 395,006 | 38% | 0.48 | 29 | 0.48 | 30 |
| -1 | 55.5285 | 40.5 | 40.5 | · | 281,332 | 27.76 | · | 13,580 | 1.58 | · | · | · | 29.34 | 395,006 | 39% | 0.49 | 29 | 0.49 | 30 |
| 0 | 55.5285 | 40.5 | 40.5 | · | 281,332 | 27.76 | · | 13,580 | 1.58 | · | · | · | 29.34 | 395,006 | 40% | 0.50 | 29 | 0.50 | 30 |
| 1 | 55.5285 | 40.5 | 40.5 | · | 281,332 | 27.76 | · | 13,580 | 1.58 | · | · | · | 29.34 | 395,006 | 40% | 0.51 | 29 | 0.51 | 30 |
| 2 | 55.5285 | 40.5 | 40.5 | · | 281,332 | 27.76 | · | 13,580 | 1.58 | · | · | · | 29.34 | 395,006 | 41% | 0.52 | 29 | 0.52 | 30 |
| 3 | 55.5285 | 40.5 | 40.5 | · | 281,332 | 27.76 | · | 13,580 | 1.58 | · | · | · | 29.34 | 395,006 | 42% | 0.53 | 29 | 0.53 | 30 |
| 4 | 55.5285 | 40.5 | 40.5 | · | 281,332 | 27.76 | · | 13,580 | 1.58 | · | · | · | 29.34 | 395,006 | 43% | 0.54 | 29 | 0.54 | 30 |
| 5 | 55.5285 | 40.5 | 40.5 | · | 281,332 | 27.76 | · | 13,580 | 1.58 | · | · | · | 29.34 | 395,006 | 43% | 0.55 | 29 | 0.55 | 30 |
| 6 | 55.5285 | 40.5 | 40.5 | · | 281,332 | 27.76 | · | 13,580 | 1.58 | · | · | · | 29.34 | 395,006 | 44% | 0.56 | 29 | 0.56 | 30 |
| 7 | 55.5285 | 40.5 | 40.5 | · | 281,332 | 27.76 | · | 13,580 | 1.58 | · | · | · | 29.34 | 395,006 | 45% | 0.57 | 29 | 0.57 | 30 |
| 8 | 55.5285 | 40.5 | 40.5 | · | 281,332 | 27.76 | · | 13,580 | 1.58 | · | · | · | 29.34 | 395,006 | 46% | 0.59 | 29 | 0.59 | 30 |
| 9 | 55.5285 | 40.5 | 40.5 | · | 281,332 | 27.76 | · | 13,580 | 1.58 | · | · | · | 29.34 | 395,006 | 47% | 0.60 | 29 | 0.60 | 30 |
| 10 | 55.5285 | 40.5 | 40.5 | · | 281,332 | 27.76 | · | 13,580 | 1.58 | · | · | · | 29.34 | 395,006 | 48% | 0.61 | 29 | 0.61 | 30 |
| 11 | 55.5285 | 40.5 | 40.5 | · | 281,332 | 27.76 | · | 13,580 | 1.58 | · | · | · | 29.34 | 395,006 | 49% | 0.63 | 29 | 0.63 | 30 |
| 12 | 55.5285 | 40.5 | 40.5 | · | 281,332 | 27.76 | · | 13,580 | 1.58 | · | · | · | 29.34 | 395,006 | 50% | 0.64 | 29 | 0.64 | 30 |
| 13 | 55.5285 | 40.5 | 40.5 | · | 281,332 | 27.76 | · | 13,580 | 1.58 | · | · | · | 29.34 | 395,006 | 52% | 0.65 | 29 | 0.65 | 30 |
| 14 | 55.5285 | 40.5 | 40.5 | · | 281,332 | 27.76 | · | 13,580 | 1.58 | · | · | · | 29.34 | 395,006 | 53% | 0.67 | 29 | 0.67 | 30 |
| 15 | 55.5285 | 40.5 | 40.5 | · | 281,332 | 27.76 | · | 13,580 | 1.58 | · | · | · | 29.34 | 395,006 | 54% | 0.69 | 29 | 0.69 | 30 |

MODEL-BASED ALARMING

CROSS-REFERENCE TO RELATED APPLICATIONS

This application is a continuation of International Application No. PCT/US02/13459, filed Apr. 29, 2002, which claims the benefit of U.S. Provisional Application No. 60/288,551 filed May 3, 2001. The disclosures of the above applications are incorporated herein by reference.

FIELD OF THE INVENTION

The present invention relates to managing building systems and, more particularly, to modeling, monitoring and evaluating building system components including refrigeration, HVAC, lighting, defrost, and anti-condensation heaters, etc.

DISCUSSION OF THE INVENTION

Refrigeration, HVAC, lighting, defrost, and anti-condensate heater systems generally require a significant amount of energy to operate. The energy requirements are thus a significant cost to building owners and tenants, especially when compounding the energy use across multiple locations. As a result, it is in the best interest of building owners and tenants to closely monitor the performance of building systems to maximize their efficiency and reduce operational costs.

Monitoring system performance and energy consumption are tedious and time-consuming operations, typically undesirable for building owners and tenants to perform independently. Generally speaking, building owners and tenants lack the expertise to accurately analyze time and temperature data, energy consumption, and other system performance data, and relate that data to system performance, maintenance and efficiency indicators. Further, a typical building owner or tenant, such as a food retailer, may have a plurality of retail locations spanning a large area. Monitoring each of the retail locations on an individual basis is inefficient and often results in redundancies.

Therefore, it is desirable in the industry to provide a method for monitoring system performance including energy consumption for one or more buildings. The method should monitor multiple locations for performance comparison purposes, avoid redundancies between individual building locations, and provide the expertise required to accurately analyze characteristics of an individual location.

Accordingly, the present invention provides a method for modeling, monitoring and evaluating a building system. The method includes a communication network and a computer system in communication with the building system through the communication network. The computer system receives information from the building system regarding performance of the building system, whereby the management center analyzes and evaluates the information for altering operation of the building system by comparison to various building system component models and environmental data. The method of the present invention further provides several alarming routines for alerting a user of specific scenarios occurring in the building system. The computer system alarms when energy consumption of building system components exceed modeled values. The computer system may be a local controller or a remote management center.

BRIEF DESCRIPTION OF THE DRAWINGS

The present invention will become more fully understood from the detailed description and the accompanying drawings, wherein:

FIG. 8 is a screen-shot of a temperature data sheet used in conjunction with the energy usage algorithm;

FIG. 10 is a screen-shot of a temperature data import sheet;

FIG. 12 is a screen-shot of a store specification component of the actual site data routine;

FIG. 13 is a screen-shot of a new site data component of the actual site data routine;

FIG. 14 is a screen-shot of a core calculator implemented with the energy usage algorithm;

FIG. 17 is a screen-shot of the power monitoring routine;

FIG. 19 is a screen-shot of the design set-up routine;

DETAILED DESCRIPTION OF THE PREFERRED EMBODIMENTS

The following description of the preferred embodiments is merely exemplary in nature and is in no way intended to limit the invention, its application, or uses.

Figure 1A:
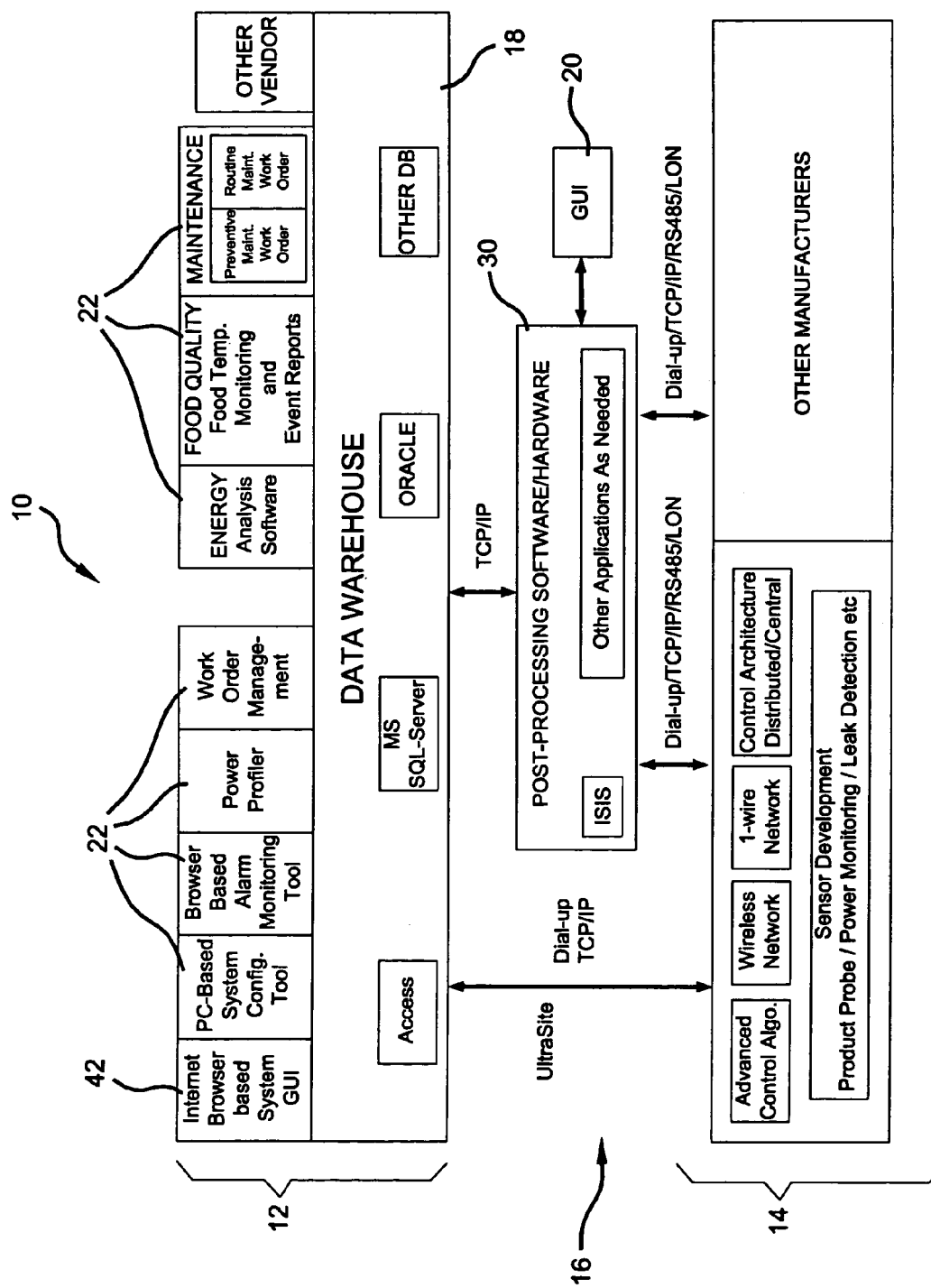
FIG. 1 is a schematic overview of a system for remotely monitoring and evaluating a remote location, in accordance with the principles of the present invention.
Figure 1B:
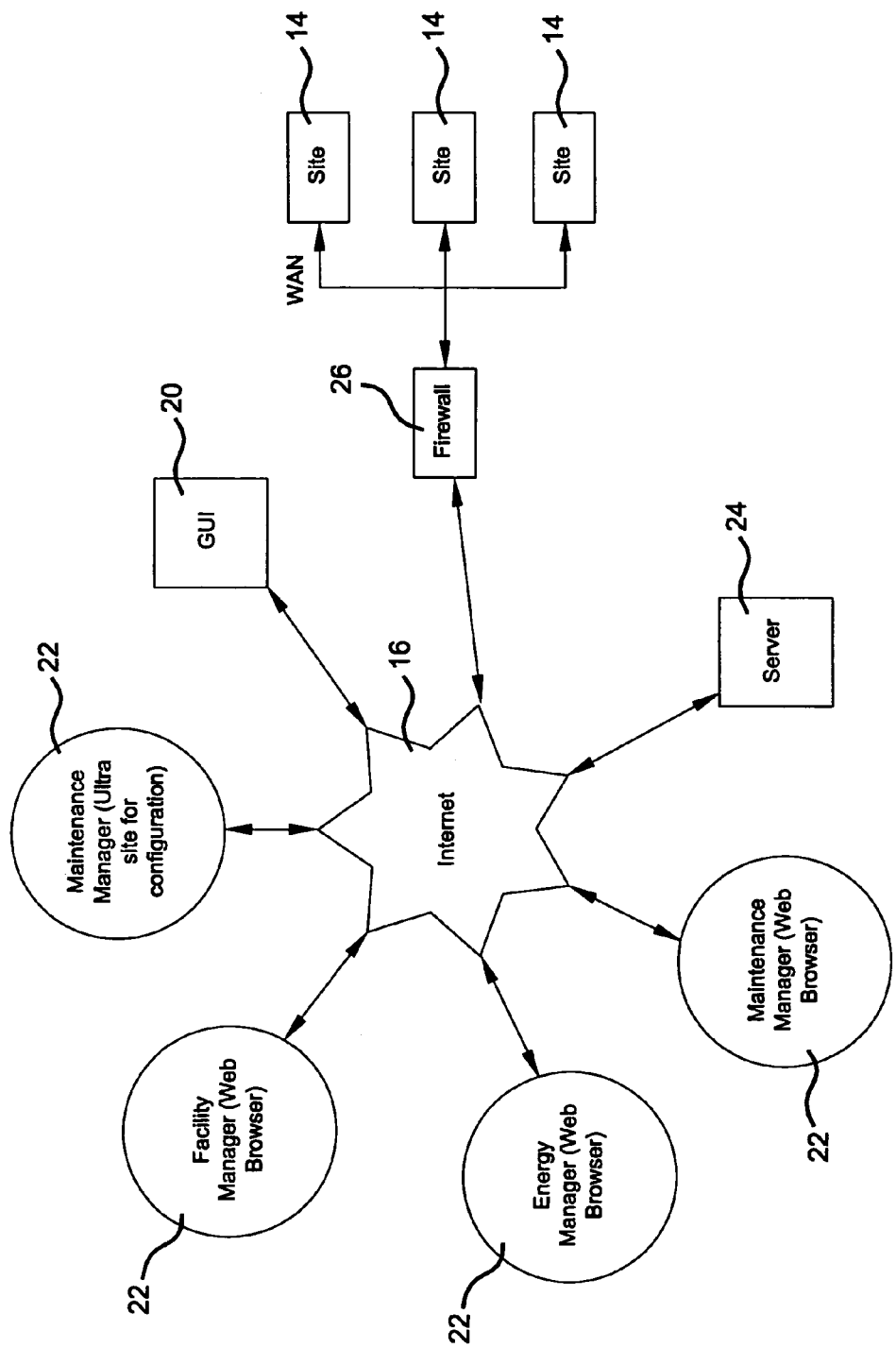

With reference to FIGS. 1A and 1B, the present invention provides a system 10 for remote monitoring, diagnosis and prognosis of food inventory and equipment of a retailer. The system 10 includes a management center 12 in communication with a computer system at a remote location 14, such as a food retail outlet, having food inventory and equipment, such as a refrigeration system, HVAC system, lighting and the like, therein. The computer system at the remote location 14 may be a server computer such as a post-processing center 30; a building system controller, i.e., for coordinating the operation of refrigeration, HVAC, or lighting systems; or a refrigeration system, HVAC system, or lighting system controller. Such a system is fully described in U.S. patent application Ser. No. 10/061,964, filed Feb. 1, 2002, titled: "System For Remote Refrigeration Monitoring And Diagnostics;" Ser. No. 10/084,618, filed Feb. 27, 2002, titled: "Food-Quality and Safety Model For Refrigerated Food;" Ser. No. 10/061,958, filed Feb. 1, 2002, titled: "Food- Quality And Shelf-life Predicting Method And System;" and Ser. No. 10/132,663, filed Apr. 25, 2002, titled: "Method Of Managing A Refrigeration System," each of which are incorporated herein by reference.

As shown, a communication network 16 is provided for operably interconnecting the management center 12 and the remote location 14 enabling information transfer therebetween. The communication network 16 preferably includes a dial-up network, TCP/IP, Internet or the like. It will be appreciated by those skilled in the art, that the management center 12 may be in communication with a plurality of remote locations 14 through the communication network 16. The management center 12 gathers operational data from the remote location 14 to analyze performance of several aspects of the remote location 14 through post-processing routines. In this manner, the management center 12 is able to monitor and analyze operation of multiple remote locations 14 and to adjust the operation of the monitored systems to improve performance.

In one variation of the invention, the management center 12 gathers and processes energy consumption information for its energy using equipment including various components of the refrigeration system and the refrigeration system as a whole. In another version of the invention, such gathering and processing of the energy consumption data occurs at the computer system at the remote location 14 as described above. Moreover, such analysis may be shared between or even duplicated by the management center 12 and computer system at the remote location 14. An analysis of the energy consumption of the energy using equipment enables the management center 12 to evaluate the overall efficiency thereof and identify any problem areas therewith.

The management center 12 may also gather information specific to each component of the refrigeration system for evaluating the maintenance measures each component may require. Both routine and preventative maintenance may be monitored and evaluated, thereby enabling the management center 12 to alert the remote location of potential equipment malfunctions. In this manner, overall efficiency of the refrigeration system may be enhanced.

Additionally, the management center 12 provides a data warehouse 18 for storing historical operational data for the remote location 14. The data warehouse 18 is preferably accessible through the communication network 16 utilizing commercially available database software such as Microsoft Access™, Microsoft SQL-Server™, ORACLE™, or any other database software.

The system 10 is remotely accessible through a graphical user interface 20 via a third-party computer system through the communication network. In an exemplary embodiment, a remote user may log into the system 10 through the Internet to view operational data for the remote location 14. The third-party computer system may include any web-enabled GUI 20 known in the art, including but not limited to a computer, a cellular phone, a hand-held portable computer (e.g., Palm Pilot™) or the like.

The GUI 20 provides a view into the system 10 and allows the user to see the data for the remote location 14 via a standard web browser. The GUI 20 also provides access to software modules 22, which preferably run on one or more servers 24. The GUI 20 can provide this access using only a standard web browser and an Internet connection. Maintenance managers will use the GUI 20 to receive alarms for a specific remote location 14, acknowledge alarms, manually dispatch work orders based on the alarms, make changes to set points, ensure that a remote location 14 is performing as required (by monitoring case temperatures, rack pressures, etc.), and check a remote location 14 after the receipt of an alarm.

More specifically, the system 10 will make use of existing network infrastructure to add value to users who use the system for collecting and/or aggregating data. This value includes speeding up (and automating) the data collection process and enabling the aggregation of data to be performed automatically. The information that is retrieved from a remote location 14 resides on servers 24. Further, the system allows the ability to add software modules 22 to the server 24 that will extract additional information from the data. Examples are analyzing trend information of pressure and compressor status over a period of time and extracting performance degradation characteristics of the compressors.

FIG. 1B shows a diagram of the communications network 16. Multiple remote locations 14 exist behind a corporate firewall 26 and that the data behind the firewall 26 must be pushed to a server 24, which exists outside the firewall 26. Users are able to access the information via an Internet connection in the standard browser. In general, the user should be given the impression that he/she is always going through the server 24 to retrieve information from the remote location 14. It is possible for a user to view both real-time data generated at the site and aggregated data in a single view. Using this architecture, software modules 22 can be easily added to perform functions on the data.

Web-based navigation is accomplished by the GUI 20, which will be interfaced for all of the software modules 22. Alarm monitoring, energy analysis, food quality, and maintenance software modules 22 are described below, and each are accessible via the GUI 20. A software module 22 may even be provided for enabling the user to completely configure a controller, as discussed in further detail below. Its primary use will be during initial configuration of the controller. A work order module provides the capability to enter and track work orders for managing the maintenance schedule of the equipment of the remote location 14. An asset management module provides the capability to enter and track assets and view asset history.

The GUI 20 also offers a number of standard screens for viewing typical site data. A store summary screen is provided and lists the status of the refrigeration, building control systems and the like. A product temperature summary screen displays product temperatures throughout the store when using product temperature probes. An alarm screen enables the user to see the status of all alarms. The alarm screen provides information about particular alarms and enables the alarm to be acknowledged and reset, as discussed in further detail hereinbelow. Basic alarm viewing/notification capability is provided and includes the ability to view an alarm, acknowledge an alarm, and receive notification of the alarm. Notification is either via GUI/browser, e-mail, facsimile, page, or text message (SMS/e-mail) to a cellular telephone. Each alarm type has the capability of selecting whether notification is required and what (and to whom) the notification method will be.

The GUI 20 provides the capability to display historical (logged) data in a graphical format. In general, the graph should be accessible from the screen with a single click. Data is overlaid from different areas (e.g. case temperature with saturated suction temperature) on a single graph. Some historical data may be stored on a server 24. In general, the display of this data should be seamless and the user should not know the source of the data.

The GUI 20 provides the capability to display aggregated remote location data, which should be displayed as aggregated values and includes the capability to display power and alarm values. These views may be selected based on user requirements. For example, the GUI 20 provides the capability to display aggregated remote location power data for an energy manager log in and aggregated alarm data for a maintenance manager log in. The GUI 20 will provide a summary-type remote location screen with power and alarms for the remote location 14 as a default.

The GUI 20 provides the capability to change frequently used set points directly on the appropriate screen. Access to other set points is achieved via a set point screen that can be easily navigated with one click from the GUI 20. In general, applications on controllers have many set points, the majority of which are not used after the initial setup.

Returning to FIG. 1A, the remote location 14 may further include a post-processing system 30 in communication with the components of the refrigeration system through the controller. The post-processing system 30 is preferably in communication with the controller through a dial-up, TCP/IP, or local area network (LAN) connection. The post-processing system 30 provides intermediate processing of gathered data, which is analyzed to provide lower-level, local warnings. These lower-level, local warnings are in contrast to more detailed, higher-level warnings provided by the post-processing routines of the management center 12. The post-processing system 30 is preferably an "In-store Information Server," or ISIS, that also provides a web gateway functionality. The ISIS platform of the preferred embodiment is a JACE/controller/web server commercially available from Tridium, Inc., of Richmond, Va., U.S.A.

Figure 2:
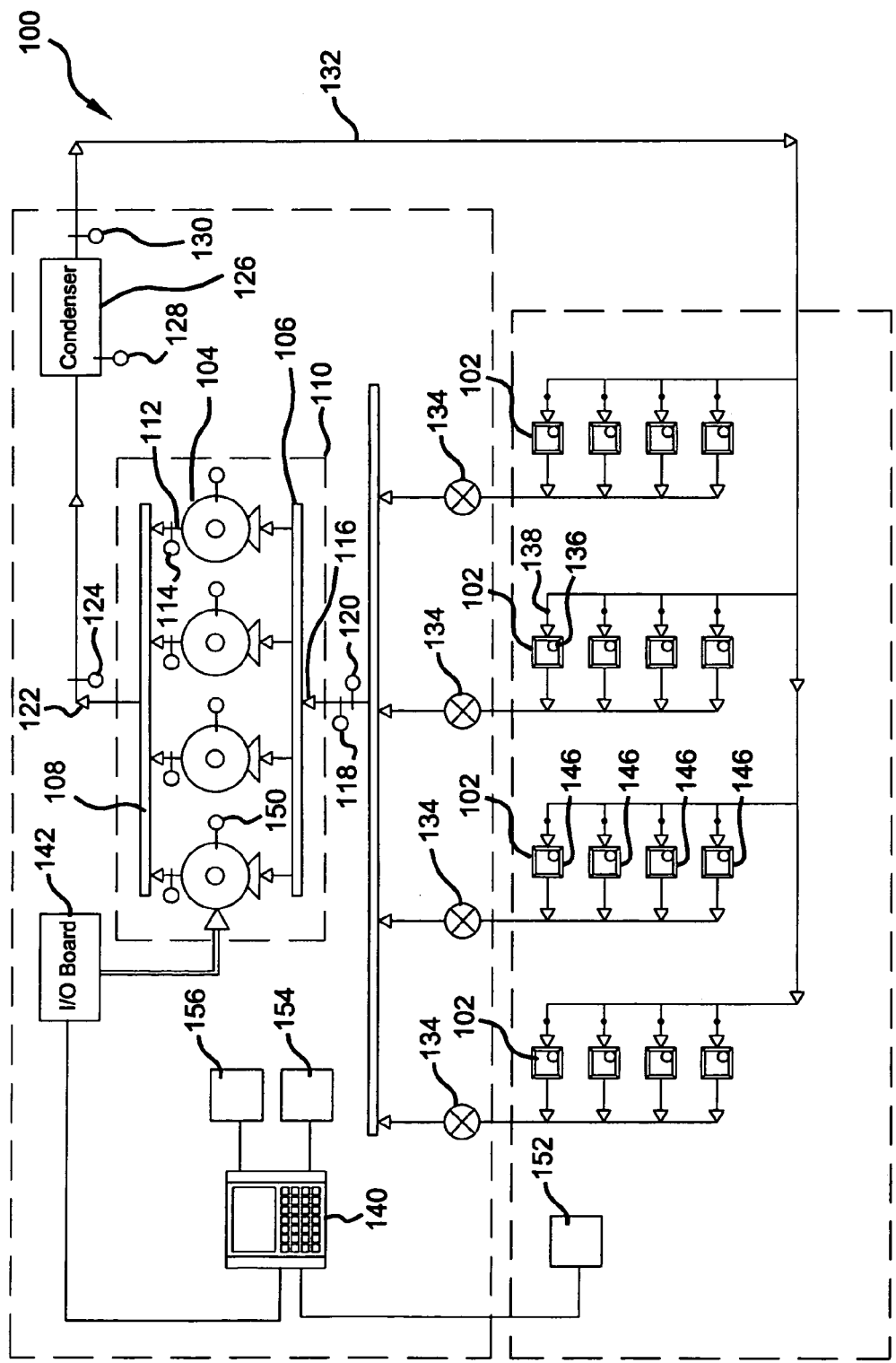
FIG. 2 is a schematic view of an exemplary refrigeration system according to the principles of the present invention.
Figure 3:
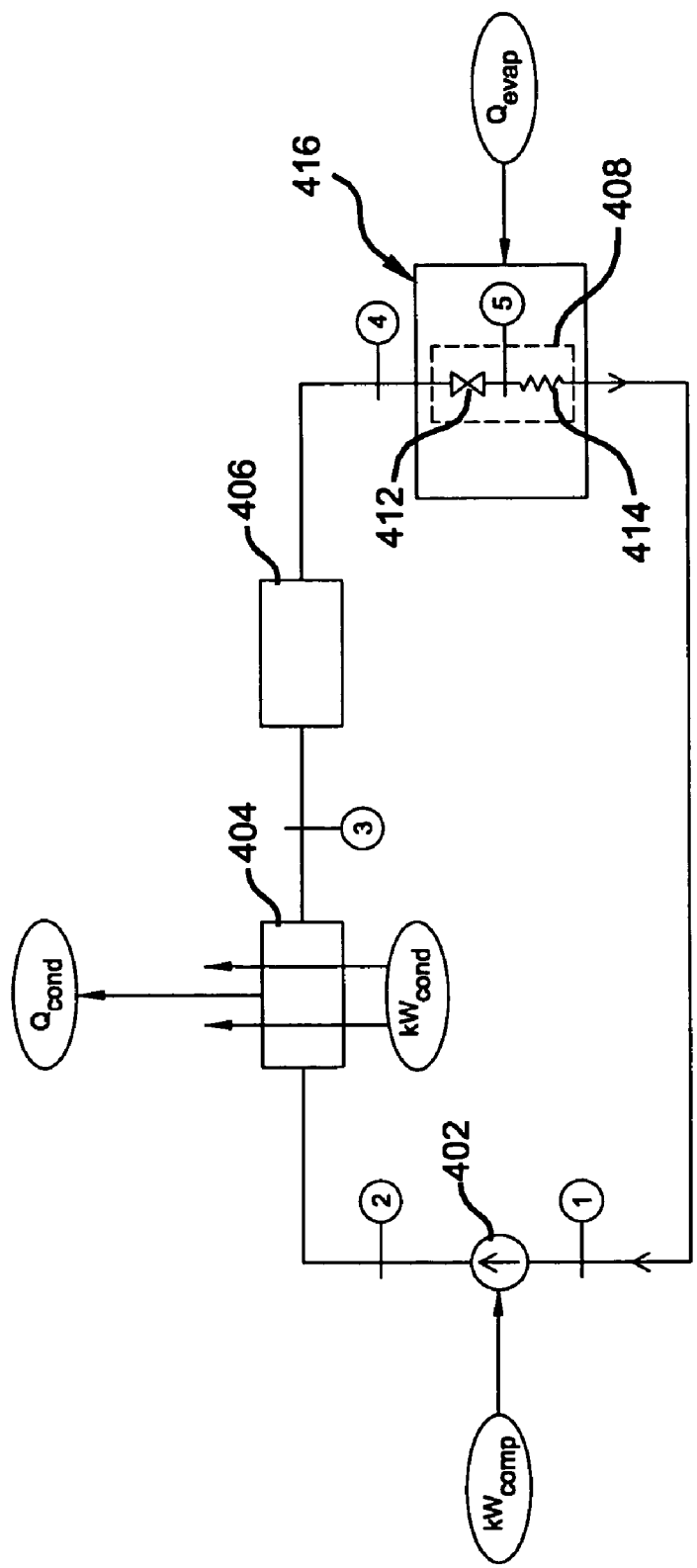
FIG. 3 is a schematic view of a refrigeration cycle for modeling energy consumption according to the invention.

With reference to FIGS. 2 and 3, an exemplary refrigeration system 100 of the remote location 14 preferably includes a plurality of refrigerated food storage cases 102. It will be appreciated that the hereindescribed refrigeration system is merely exemplary in nature. The refrigeration system of the remote location may vary as particular design requirements of the location dictate.

As shown, the refrigeration system 100 includes a plurality of compressors 104 piped together with a common suction manifold 106 and a discharge header 108 all positioned within a compressor rack 110. A discharge output 112 of each compressor 102 includes a respective temperature sensor 114. An input 116 to the suction manifold 106 includes both a pressure sensor 118 and a temperature sensor 120. Further, a discharge outlet 122 of the discharge header 108 includes an associated pressure sensor 124. As described in further detail hereinbelow, the various sensors are implemented for evaluating maintenance requirements.

The compressor rack 110 compresses refrigerant vapor that is delivered to a condenser 126 where the refrigerant vapor is liquefied at high pressure. The condenser 126 includes an associated ambient temperature sensor 128 and an outlet pressure sensor 130. This high-pressure liquid refrigerant is delivered to a plurality of refrigeration cases 102 by way of piping 132. Each refrigeration case 102 is arranged in separate circuits consisting of a plurality of refrigeration cases 102 that operate within a certain temperature range. FIG. 2 illustrates four (4) circuits labeled circuit A, circuit B, circuit C and circuit D. Each circuit is shown consisting of four (4) refrigeration cases 102. However, those skilled in the art will recognize that any number of circuits, as well as any number of refrigeration cases 102 may be employed within a circuit. As indicated, each circuit will generally operate within a certain temperature range. For example, circuit A may be for frozen food, circuit B may be for dairy, circuit C may be for meat, etc.

Because the temperature requirement is different for each circuit, each circuit includes a pressure regulator 134 that acts to control the evaporator pressure and, hence, the temperature of the refrigerated space in the refrigeration cases 102. The pressure regulators 134 can be electronically or mechanically controlled. Each refrigeration case 102 also includes its own evaporator 136 and its own expansion valve 138 that may be either a mechanical or an electronic valve for controlling the superheat of the refrigerant. In this regard, refrigerant is delivered by piping to the evaporator 136 in each refrigeration case 102. The refrigerant passes through the expansion valve 138 where a pressure drop causes the high pressure liquid refrigerant to achieve a lower pressure combination of liquid and vapor. As hot air from the refrigeration case 102 moves across the evaporator 136, the low pressure liquid turns into gas. This low pressure gas is delivered to the pressure regulator 134 associated with that particular circuit. At the pressure regulator 134, the pressure is dropped as the gas returns to the compressor rack 110. At the compressor rack 110, the low pressure gas is again compressed to a high pressure gas, which is delivered to the condenser 126, which creates a high pressure liquid to supply to the expansion valve 138 and start the refrigeration cycle again.

A main refrigeration controller 140 is used and configured or programmed to control the operation of the refrigeration system 100. The refrigeration controller 140 is preferably an Einstein Area Controller offered by CPC, Inc. of Atlanta, Ga., U.S.A., or any other type of programmable controller that may be programmed, as discussed herein. The refrigeration controller 140 controls the bank of compressors 104 in the compressor rack 110, via an input/output module 142. The input/output module 142 has relay switches to turn the compressors 104 on an off to provide the desired suction pressure. A separate case controller (not shown), such as a CC-100 case controller, also offered by CPC, Inc. of Atlanta, Ga., U.S.A., may be used to control the superheat of the refrigerant to each refrigeration case 102, via an electronic expansion valve in each refrigeration case 102 by way of a communication network or bus. Alternatively, a mechanical expansion valve may be used in place of the separate case controller. Should separate case controllers be utilized, the main refrigeration controller 140 may be used to configure each separate case controller, also via the communication bus. The communication bus may either be a RS-485 communication bus or a LonWorks Echelon bus that enables the main refrigeration controller 140 and the separate case controllers to receive information from each refrigeration case 102.

Each refrigeration case 102 may have a temperature sensor 146 associated therewith, as shown for circuit B. The temperature sensor 146 can be electronically or wirelessly connected to the controller 140 or the expansion valve for the refrigeration case 102. Each refrigeration case 102 in the circuit B may have a separate temperature sensor 146 to take average/min/max temperatures or a single temperature sensor 146 in one refrigeration case 102 within circuit B may be used to control each refrigeration case 102 in circuit B because all of the refrigeration cases 102 in a given circuit operate at substantially the same temperature range. These temperature inputs are preferably provided to the analog input board 142, which returns the information to the main refrigeration controller 140 via the communication bus.

Additionally, further sensors are provided and correspond with each component of the refrigeration system and are in communication with the refrigeration controller. Energy sensors 150 are associated with the compressors 104 and condenser 126 of the refrigeration system 100. The energy sensors 150 monitor energy consumption of their respective components and relay that information to the controller 140.

Circuits and refrigeration cases 102 of the refrigeration system 100 include a screen 152 illustrating the type and status of the refrigeration case 102 or circuit. Temperatures are displayed via graphical means (e.g. a thermometer) with an indication of set point and alarm values. The screen 152 supports a display of case temperatures (i.e., return, discharge, defrost termination, coil in, coil out, and product temperatures) and the status of any digital inputs (i.e. cleaning, termination, etc.). The screen 152 also displays a defrost schedule and the type of termination (i.e. time, digital, temperature) for the last defrost. In general, all information related to a refrigeration case 102 or circuit will be displayed on or accessible through the screen 152.

A screen 154 is also provided to graphically display the status of each configured suction group. Discharge and suction pressures are displayed as gauges intended to be similar to the gauge set a refrigeration mechanic would use. The corresponding saturated suction temperature will be displayed as well. In general, suction groups are displayed graphically with icons that represent each compressor 104. The status of the compressors 104 is shown graphically, as well as the status of any configured unloaders. In general, all status information for a suction group is displayed on the screen 154.

A screen 156 is also provided to graphically display the status of each configured condenser 126. The suction and discharge pressure of the condenser 126 are displayed as gauges intended to be similar to a gauge set a refrigeration mechanic would use. The corresponding condensing temperature will be displayed as well. In general, the condenser 126 should be displayed graphically with icons that represent each fan of the condenser 126. A status of the fans is shown graphically. In general, all status information for a condenser 126 will be displayed on the screen 156.

A screen (not shown) will also be provided for roof top units (not shown), the detailed description of which is foregone. The status of the roof top unit will be shown with animated graphics (fan, airflow, cooling, heating, as animated pieces). The screen will also show the space temperature, supply temperature, etc. The set point and alarm values are shown for the space temperature. Humidity and humidity control may also be shown if configured.

The present invention also provides a method for gathering and processing energy consumption information for various components of a building system. In summary, energy consumption for various loads, such as refrigeration, HVAC, lighting, defrost and anti-condensation heating (ACH) is modeled for a particular facility. The model-calculated energy consumption is compared with actual energy consumption, and an alarm is provided when the differences exceed a predetermined limit. Because each system component load depends on several variables, each model is created to generate a relationship between several dependent variables and the energy consumption.

As an example, the refrigeration and HVAC models functionally relate compressor energy consumption (kWh) and condenser energy consumption (kWh) for an air-cooled condenser with outdoor dry bulb temperature; or compressor kilowatt hours and condenser power for a water-cooled condenser with outdoor wet bulb temperature. As another example, for a defrost system, defrost energy consumption (kWh) hours for an electric power defroster are functionally related to building relative humidity. For a lighting system, as a contrasting example, there are typically no dependent variables as the lighting load is relatively steady for a given facility, depending only on the season and time of operation. As another example, the anti-condensation heaters are modeled by functionally relating heater energy consumption (kWh) with the building dew point.

The energy-consumption models are calculated using system information including OEM design data, control methods, and operating parameters. OEM design data include, for example, fixture load, air-conditioning load, condenser fan capacity, condenser fan horsepower, compressor efficiency, and refrigerant type. Control methods include, for example, condenser pressure control versus temperature-difference (T-D) control, and cycling on/off versus variable frequency fan control. Operating parameters include suction temperature set point, condenser pressure set point for condenser pressure control, T-D set point for T-D condenser control, supply air temperature set point, and economizer settings. The energy consumption model for refrigeration and HVAC systems applies thermodynamic equations (mass and energy balance) to the above-described system information including OEM design data, control methods, and operating parameters.

As and example and to further understand the energy consumption model, a conventional refrigeration system is shown in FIG. 3 with several refrigeration states indicated. Generally speaking, refrigerant flows through the refrigeration cycle taking heat at the evaporator, and thereby cooling the product or environment. At state 1, the refrigerant becomes a superheated gas at low pressure. The refrigerant is compressed in compressor 402 at state 2 where the refrigerant remains superheated, but is now at a high pressure and temperature. The superheated refrigerant is condensed by a condenser 404, wherein fans move air through the condenser 404 to cool the refrigerant, thereby condensing the refrigerant to liquid at state 3. While the pressure remains high at state 3, the gas has cooled and condensed to liquid. At state 4, the refrigerant is further cooled by a subcooler 406 to create a subcooled liquid. A state 5, the subcooled liquid expands from high pressure to low pressure in an evaporator 408 disposed in a fixture 416, and including an expansion valve 412 and an evaporator coil 414, creating a very cold two-phase refrigerant. The two-phase refrigerant boils to a single-phase refrigerant gas by taking heat from air flowing over the evaporator coil, thereby completing the cycle.

In order to create an energy-consumption model 410, condenser fan power and compressor power are calculated for various outdoor air temperatures. The model 410 is a set of simultaneously solved equations based on the thermodynamics of the refrigeration cycle described above. For any state 1, 2, 3, 4, 5 two of the following five thermodynamic properties allow you to solve for the others: pressure (P), temperature (T), enthalpy (h), entropy (s) and quality (q).

At state 1: $P_1=f(T_{suction}, q=1)$; $h_1=f(P_1, T_{rg})$; and $s_1=f(P_1, T_{rg})$; where $T_{rg}$ is the return gas temperature and $T_{suction}$ is the temperature of the suction gas. $T_{rg}$ and $T_{suction}$ are user inputs and q=1 is assumed.

For state 2, the compression of refrigerant from a superheated gas at low pressure to a superheated gas high pressure and temperature is isentropic. Therefore the entropy (s) does not change. Accordingly: $s_2=s_1$; $P_2$=user input value; and $h_{2\ ideal}=f(s_2, P_2)$. Power calculations for the compressor follow as: $kW_{compr\ ideal\ per\ lb.}=h_{2\ ideal}-h_1$; $kW_{compr\ actual\ per\ lb.}=kW_{compr\ ideal\ per\ lb.}/$compressor efficiency; and $h_2=h_1+kW_{compr\ actual\ per\ lb.}$; wherein the compressor efficiency is a user input.

In state 3, the superheated refrigerant gas is cooled and condensed to saturated liquid (where it is assumed the pressure drop across the condenser is negligible and q=0). Thus, $P_3=P_2$; $h_3=f(P_3, q=0)$; and $T_3=f(P_3, q=0)$.

At state 4, the refrigerant is further cooled to create a subcooled liquid. The amount of subcooling is a user input (SC) and the pressure drop across the subcooler is assumed to be negligible. Thus, $P_4=P_3$; $T_4=T_3-SC$; and $h_4=f(P_4, T_4)$.

The thermodynamic process of the refrigerant expanding across the expansion valve at state 5 is isenthalpic, whereby enthalpy is constant. Thus, $h_5=h_4$. The pressure drop across the evaporator coils is assumed to be negligible. Thus, $P_5=P_1$; $P_5=f(h_5, P_5)$; and $q_5=f(h_5, P_5)$.

The mass of refrigerant (m$\lambda$) is calculated as follows: m$\lambda=Q_{evap}/(h_1-h_5)$, wherein $Q_{evap}$ is the total heat rejected at the evaporator, a user input. Using the result of this calculation, $kW_{comp}=m\lambda \times kW_{compr\ actual\ per\ lb.}$ The total heat rejected by the condenser ($Q_{cond}$) is calculated as: $Q_{cond}=m\lambda \times (h_3-h_2)$. Further, when all condenser fans are operating, the maximum heat that can be rejected at the condenser is calculates as: $Q_{cond\ max}$=condenser design capacity/($T_{ambient}-T_3$). Thus, the percent capacity of the condenser required is as follows: PerCap=$Q_{cond}/Q_{cond\ max}$. The $kW_{cond}$=PerCap×Total Fan kW, wherein Total Fan kW is a user input based on fan design data.

Figure 4:
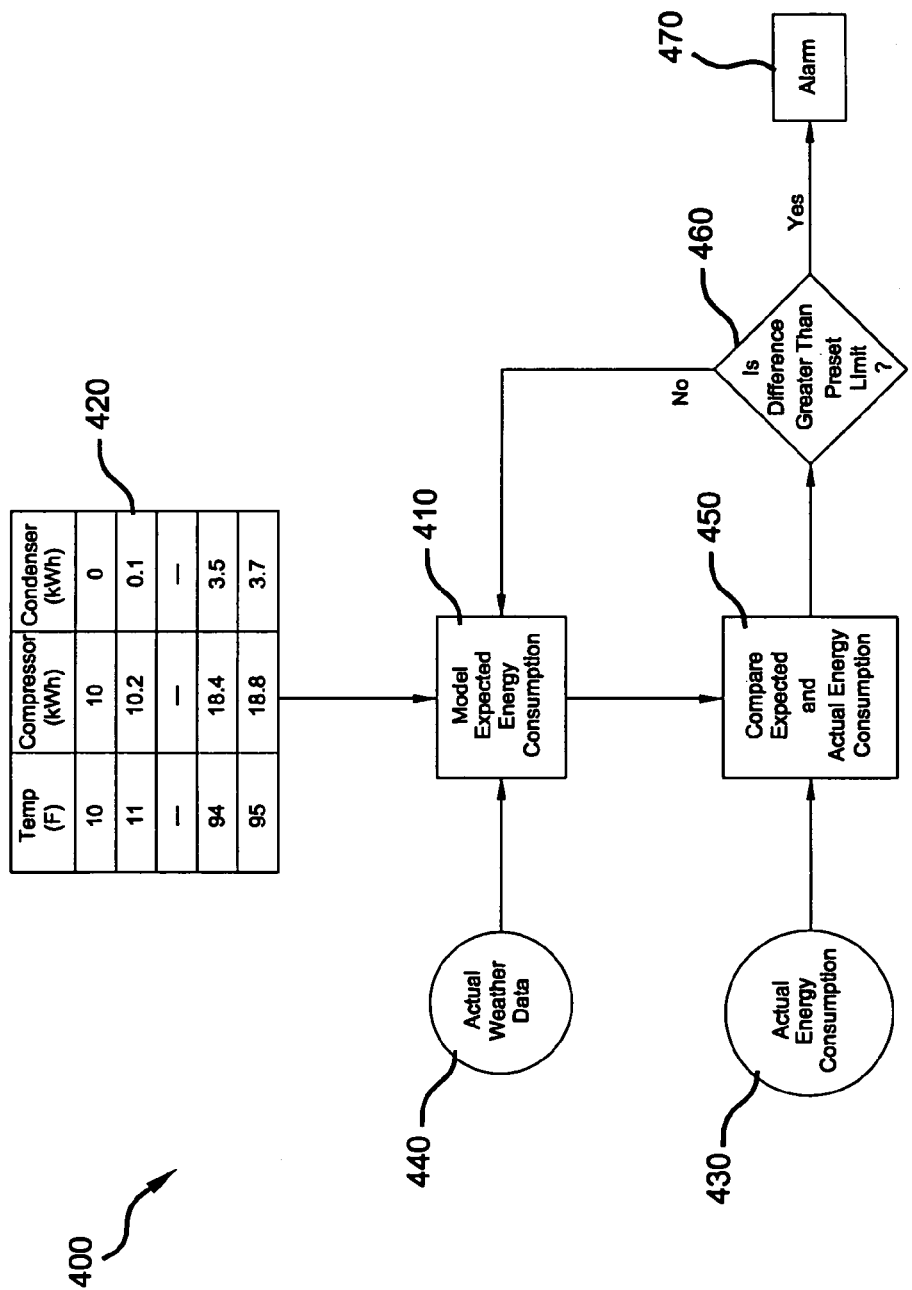
FIGS. 4–6 are each a graphical representation and flow chart of model-based alarming according to variations of the invention.

For the energy consumption model, the previous equations are simultaneously solved for various sets of ambient temperature ($T_{ambient}$) to calculate energy consumption by the compressor ($kW_{comp}$) and condenser ($kW_{cond}$). From these simultaneously solved equations, a look-up table 420 is generated for model-based alarming 400. Referring to FIG. 4, the model 410 is calculated for various ambient temperatures from which expected compressor and condenser power values are calculated and provided as look-up table 420. Actual energy consumption is preferably measured as actual kilowatt hours. While such measurements can be made at any frequency, they are preferably measured at least daily by energy meters, and the data is recorded periodically in a database. Actual weather data, such as dry bulb or wet bulb temperature, is measured at step 440 at the building location or is collected from a nearby weather station and stored in a database. Using data from the look-up table 420, the expected energy consumption model 410 is created using the actual weather data, such as wet bulb temperature for a water-cooled condenser or dry bulb temperature for an air-cooled condenser. The model 410 outputs an expected energy consumption value, preferably in kilowatt hours. At step 450, the expected energy consumption is compared with the actual energy consumption, preferably as power consumption measurement expressed in kilowatt hours. The comparison can be made at any frequency, but is preferably made on a daily basis. At step 460, if the difference between expected and actual energy consumption exceeds a predefined limit, such as ten (10) percent, an alarm is generated at 470. Otherwise, the model 410 is again generated and the comparison made at the next scheduled frequency.

Figure 5:
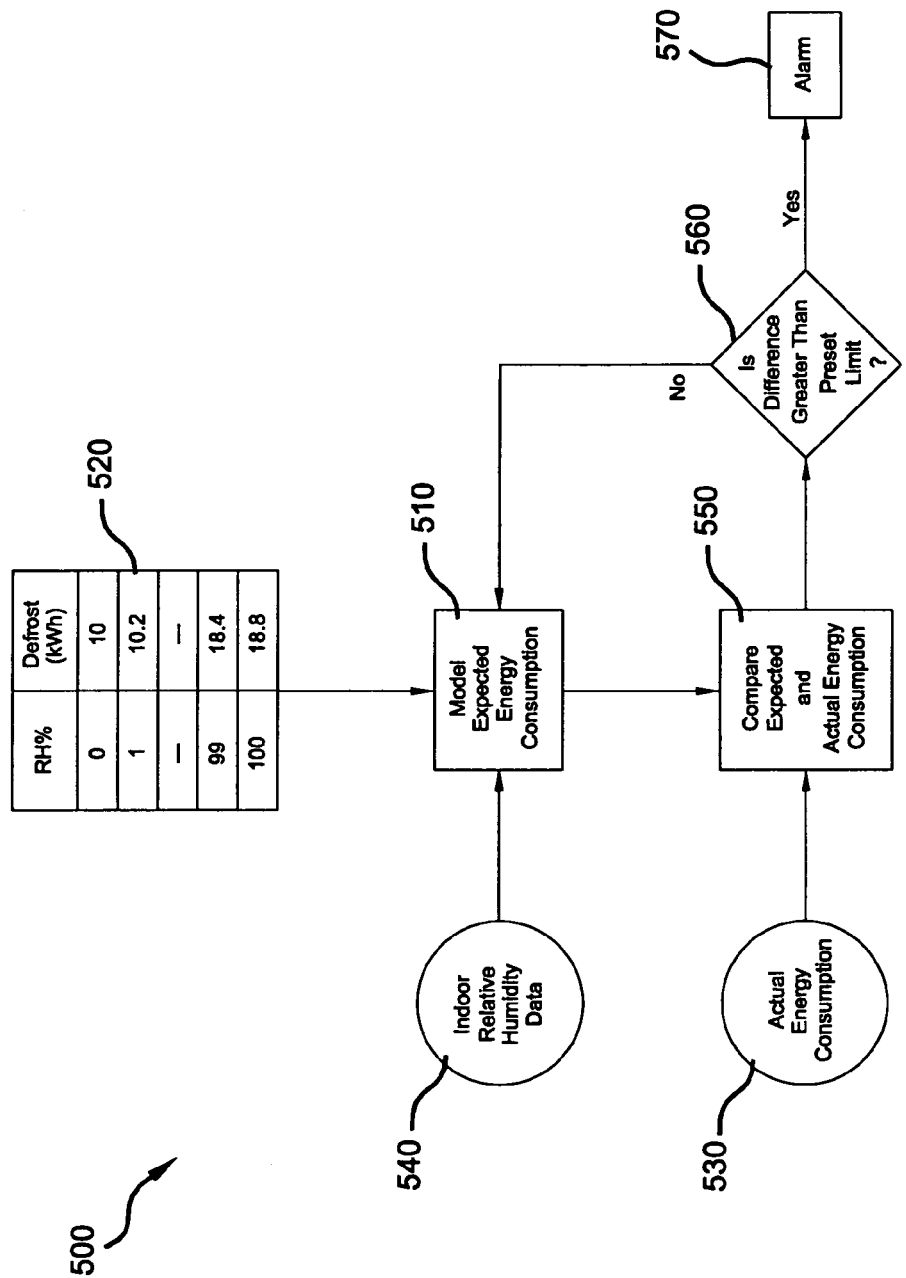

Model-based alarming 500 for defrost system energy consumption is illustrated in FIG. 5, wherein a model 510 of expected energy consumption is created with the input of a look-up table 520 and actual weather data 540. The look-up table 520 preferably functionally relates relative humidity percent and defrost power consumption. The model 510 requires input parameters such as the power rating of the particular defrost heaters for each case in a circuit, the particular defrost strategy (e.g., fixed time or temperature termination), the number of defrost heaters, etc. The relative humidity percentage is measured at step 540 and the expected power consumption is calculated using the look-up table 520. Actual energy consumption is measured at 530, and then compared at 550 to the expected energy consumption as generated by the model 510. At step 560, if the difference exceeds a preset limit, such as five (5) percent, an alarm is generated at step 570. Otherwise, the model 510 is created at the next scheduled frequency.

Figure 6:
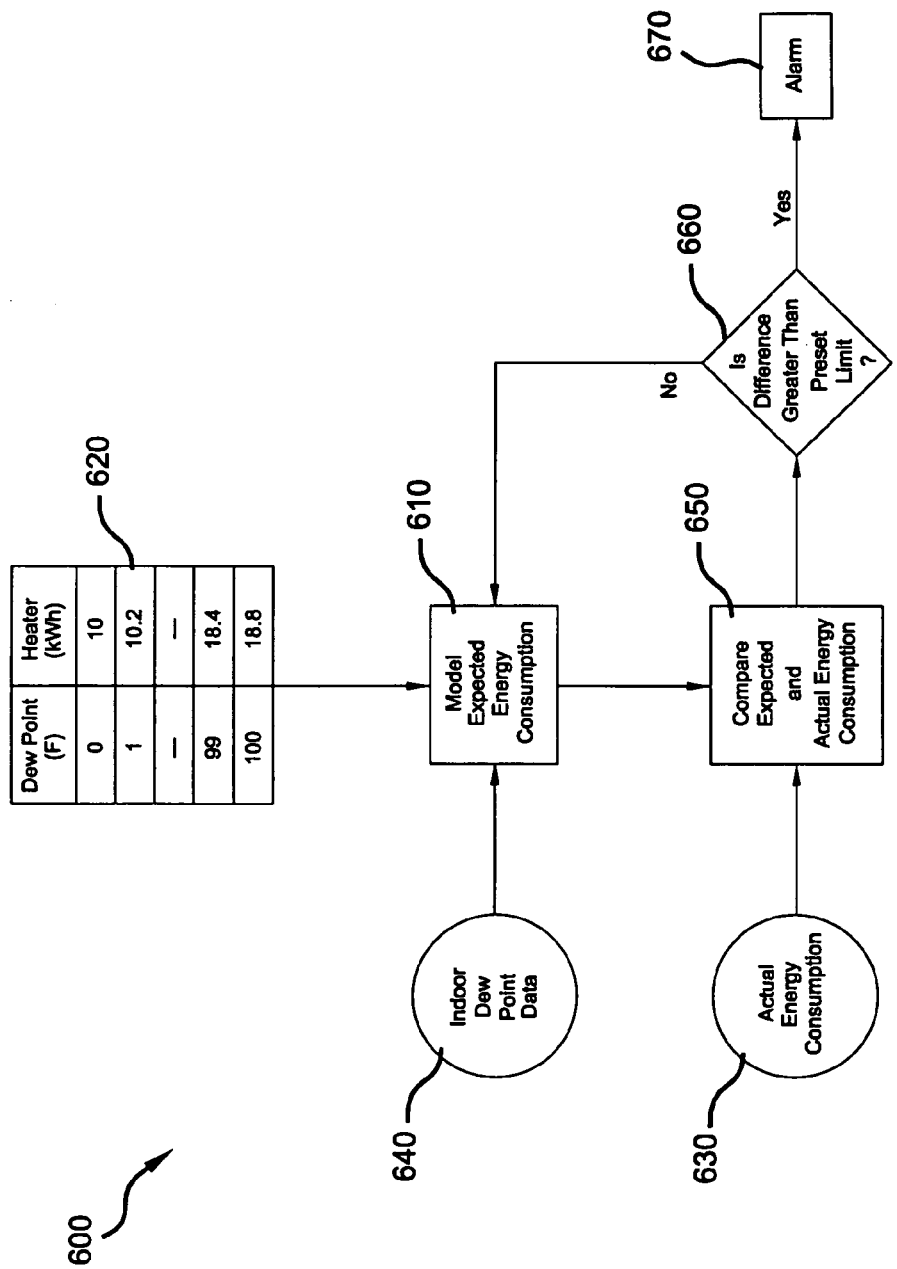

Concerning ACH modeling, FIG. 6 illustrates model-based alarming 600 according to the invention. For ACH energy consumption, a look-up table 620 is generated for each circuit. The look-up table 620 functionally relates indoor dew point temperature and power consumption data for the anti-condensation heater. A model 610 includes input parameters such as the power consumption rating of the anti-condensation heaters for each case in the circuit, the anti-condensation strategy (e.g., fixed time or temperature termination), etc. The indoor dew point temperature is measured at step 640, and the expected power consumption is modeled at 610 using the data in the look-up table 620. The actual energy consumption is monitored at step 630, and the actual and expected energy consumption is compared at step 650. At step 660, if the difference is more than a preset limit, such as five (5) percent, an alarm is generated at step 670.

Regarding modeling the power consumption of lighting, the daily power consumption of lighting is relatively steady for a given building system, depending on the season and the time of operation for a particular building. The lighting load is manually measured on-site to ensure that all light fixtures are working properly and are powered on at the appropriate time of day. Where parking lot lighting fixtures are included and controlled based on illumination level, an alternative strategy may be employed. Based on the actual measured energy consumption, the actual energy consumption is continually monitored on a periodic basis, typically daily. Where the difference between the daily measured power consumption and the actual expected power consumption is greater than a preset limit, such as five (5) percent, an alarm is generated.

When alarming according to the invention, the alarm can be any type of notification whether audible, visual, or a memory-stored event. Further the alarm can be local or remote, or both. A case controller, system controller (e.g., Eintsein Area Controller), building system controller or server, ISIS, LAN computer, third-party computer (dial-up, TCP/IP, etc.), processing center, or management center may alarm alone or in combination. Moreover, alarms may issue at more than one location.

Of particular importance to food retailers is the energy consumption of the refrigeration system 100. To monitor the energy consumption performance of the refrigeration system 100, a software module 22 is provided that runs the hereindescribed algorithms and routines required. In the present embodiment, the software is provided as a Microsoft™ Excel™ workbook implementing the Visual Basic programming language. It is anticipated, however, that the software may be provided in any one of a number of formats or programmed using any one of a number of programming languages commonly known in the art.

Figure 7:
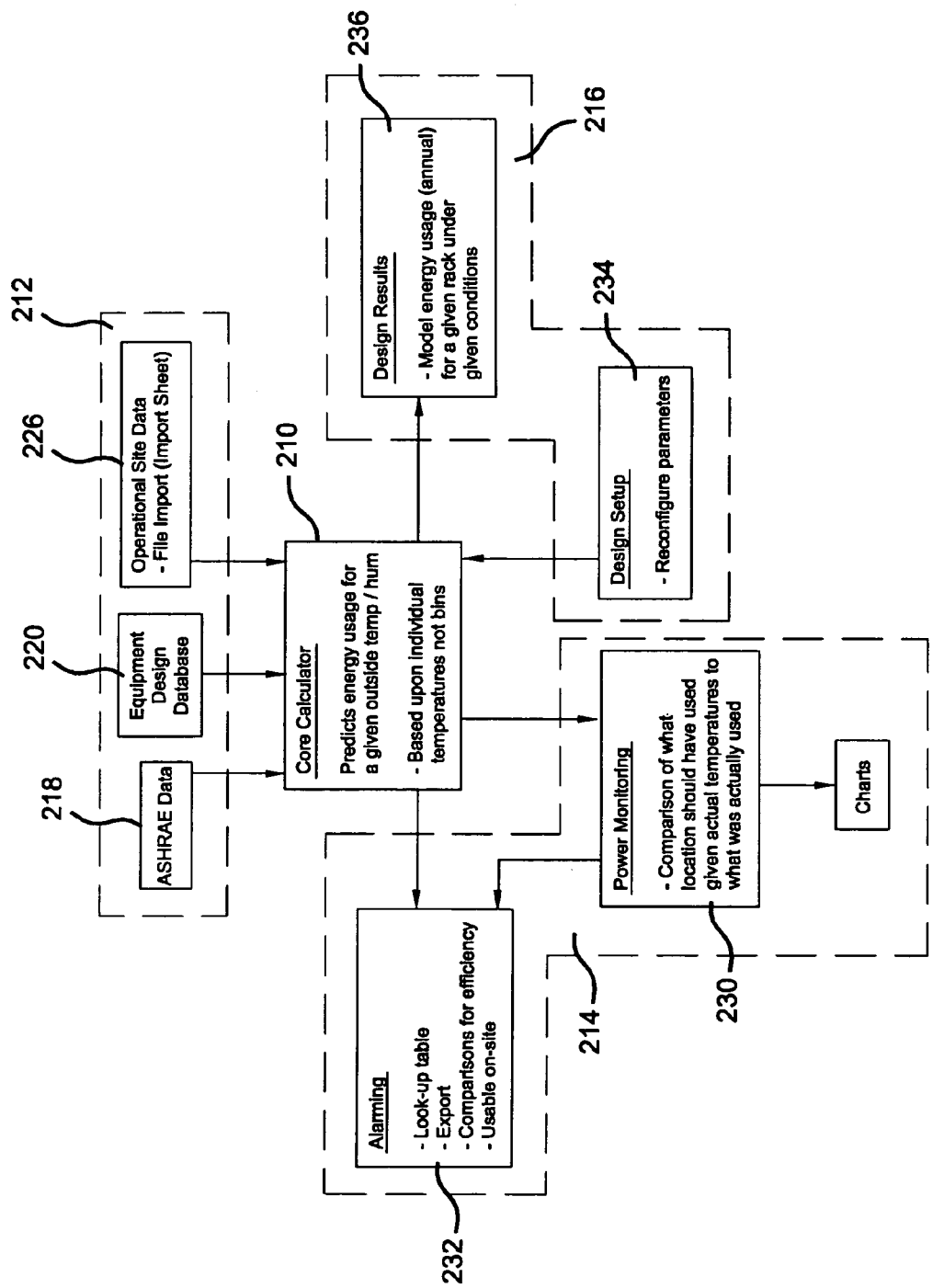
FIG. 7 is a schematic view of an energy usage algorithm in according to the principles of the present invention.

With reference to FIG. 7, a schematic overview of the present method and supporting software is shown. In general, the method of the present invention operates around a core calculator 210 that receives information from an input block 212 and provides outputs to both an efficiency block 214 and a design block 216. The input block 212 includes three main components. The first component is weather data

Figure 9:
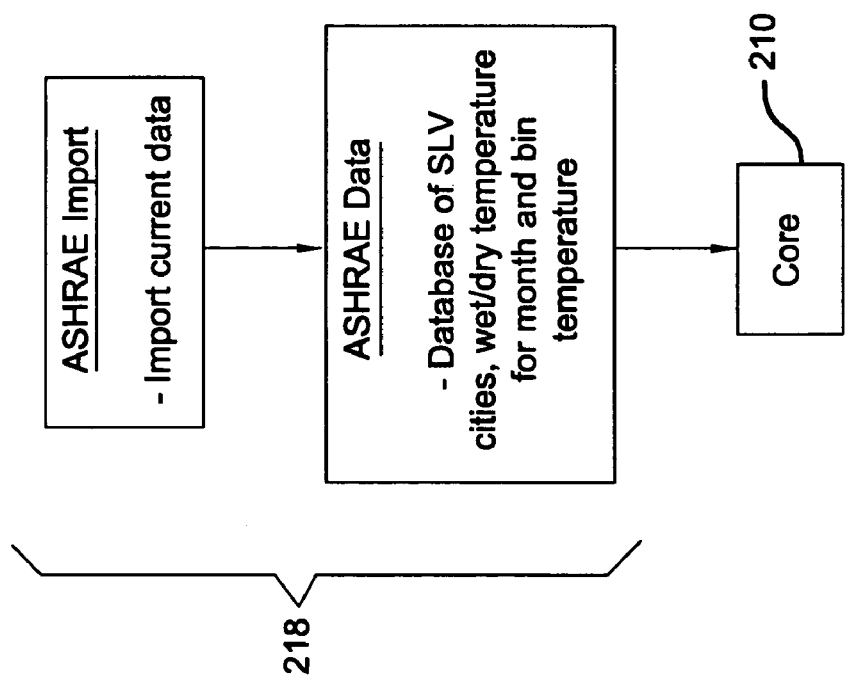
FIG. 9 is a schematic view of a temperature data routine.

218 provided as a look-up table, based on information from the American Society of Heating, Refrigerating and Air Conditioning Engineers, Inc. (ASHRAE) of Atlanta, Ga., U.S.A. The ASHRAE look-up table includes general climate information for several cities throughout the United States and Canada, as averages over a ten-year period. With reference to FIG. 8, a screen-shot is provided displaying the ASHRAE data as it would appear in an Excel™ workbook and FIG. 9 provides a schematic layout of the ASHRAE component. The ASHRAE data includes both wet and dry bulb temperature data for the remote location 14 during particular months. As seen in FIG. 8, temperature information is provided for specific cities based upon month and a bin temperature. The bin temperatures range from a maximum of one hundred twenty-six and one-half (126.5) degrees Fahrenheit and step down by increments of seven (7) degrees Fahrenheit. Reading FIG. 8, the number of hours a particular city experiences a particular temperature in the particular month, is provided. For example, during the month of January, Edmonton, Alberta, Canada experiences a dry bulb temperature of thirty-five (35) degrees Fahrenheit for a total of eight (8) hours that month. Current ASHRAE data may be imported, as shown in FIG. 9, thereby ensuring the most current data for the dependent calculations. The ASHRAE component provides output information for use by the core calculator.

Figure 11:
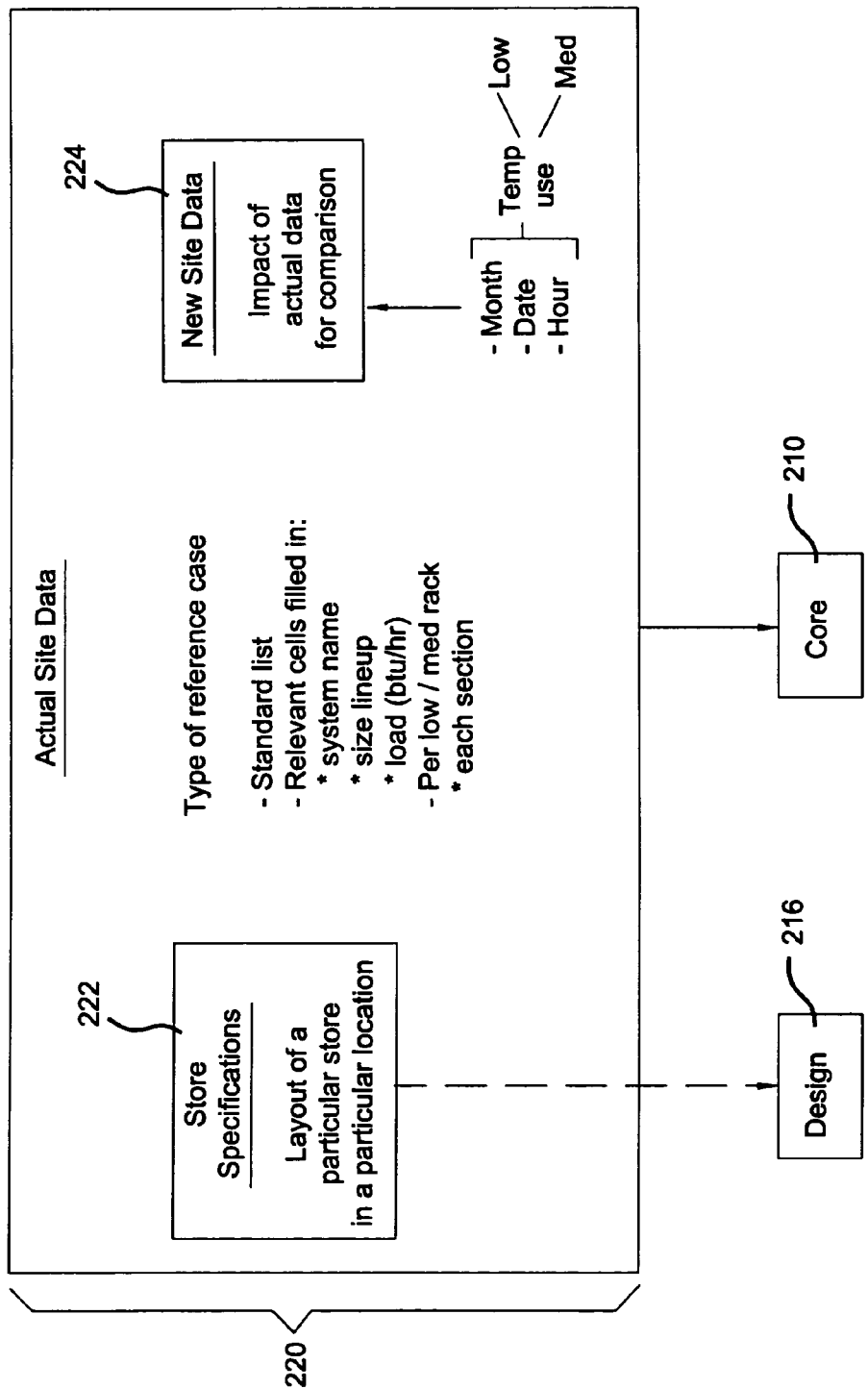
FIG. 11 is a schematic view of an actual site data routine implemented in the energy usage algorithm.
Figure 12:
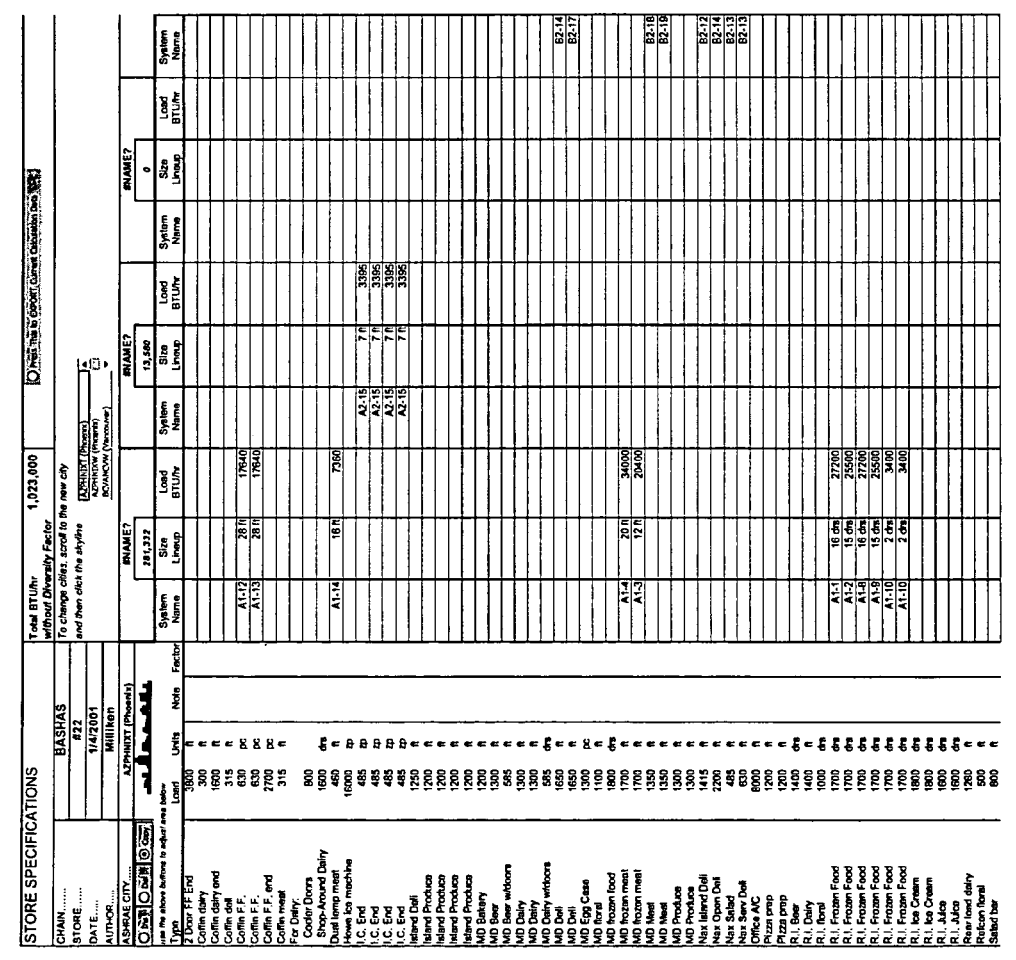

The second component includes actual site data 220, which comprises both store specification and new site data components 222,224, respectively, as shown schematically in FIG. 11. The store specification component 222 accounts for the various refrigeration components operating at a specific remote location 14. With reference to FIG. 12, a screen-shot is provided displaying an exemplary remote location 14 and its related refrigeration components, as it would appear in an Excel™ workbook. A standard component list is provided and only the information for equipment actually on-site is listed in the corresponding cells. This information includes: system name, size line-up and load (BTU/hr). The information is provided per a rack type (i.e., low temperature rack, medium temperature rack, etc.). Particular information from the store specification component 222 is also provided to the design block 216, as described in further detail hereinbelow.

With reference to FIG. 13, a screen-shot is provided displaying exemplary data from a food retailer, as provided by the new site data component. The new site data component 224 is an import sheet that imports actual retailer data by month, date and hour. This data includes ambient temperature and power usage per rack type.

Again referencing FIG. 13, the third component of the input block includes a database 226 of information regarding actual operational parameters for specific equipment types and manufacturers. This information would be provided by CPC, Inc. of Atlanta, Ga., U.S.A., based on industry experience, test data, and a particular product's specifications. It is anticipated that this information be employed to evaluate a particular component's performance to other component's in the industry as a whole.

The core calculator 210 calculates the projected energy use per rack type. The calculations are provided per ambient temperature and are calculated using information from the input block 212 and the design block 216 as described in more detail below. With particular reference to FIG. 14, a screen-shot is provided displaying a portion of the core calculator 210. As shown, a range of ambient temperatures is provided in the left-most column. It is important to note that these temperatures are not bin temperatures, as described above, but are provided as actual ambient temperatures. The core calculator 210 calculates the total annual energy consumption for both the compressor and condenser of a particular type of rack. These values are shown in the right-most columns of FIG. 14. For example, given an ambient temperature of zero (0) degrees Fahrenheit, the total theoretical compressor energy usage is 29.34 kWh, as based upon individual suction temperatures, and the total theoretical condenser energy usage is 0.5 kWh.

Figure 15:
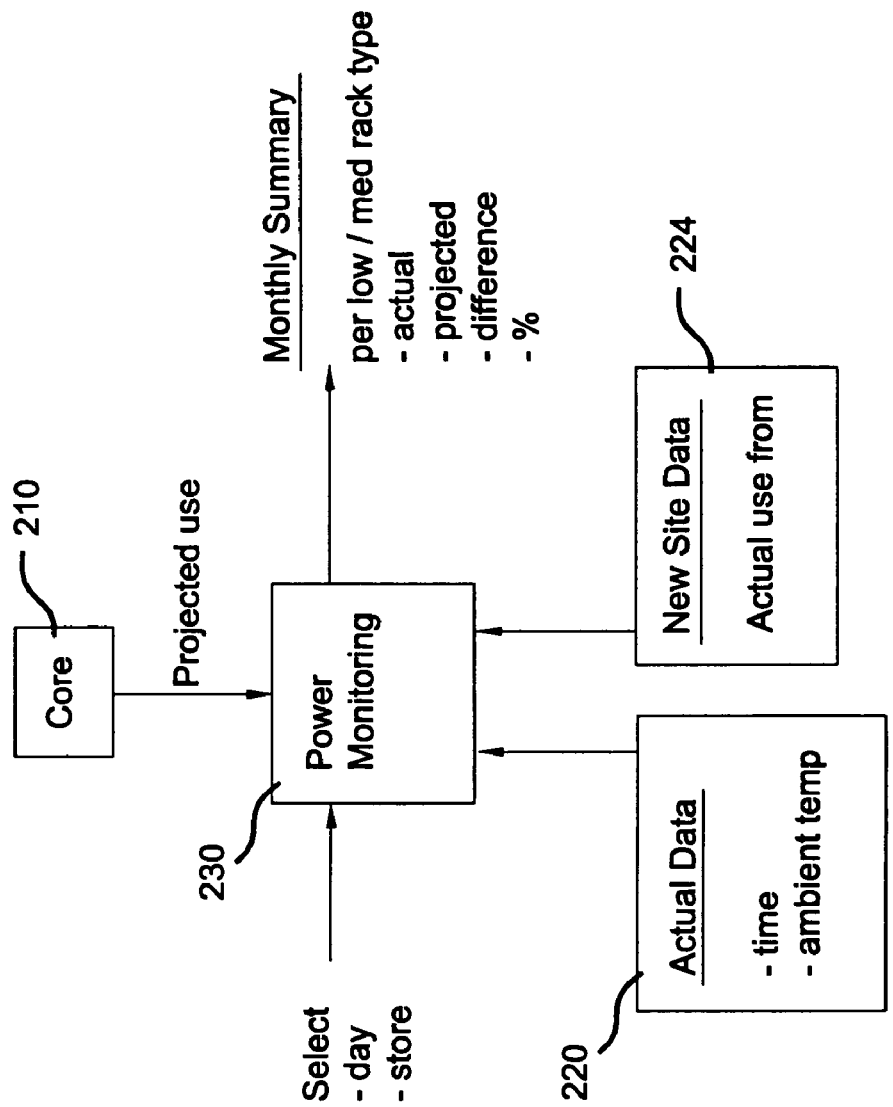
FIG. 15 is a schematic view of a power monitoring routine.
Figure 16:
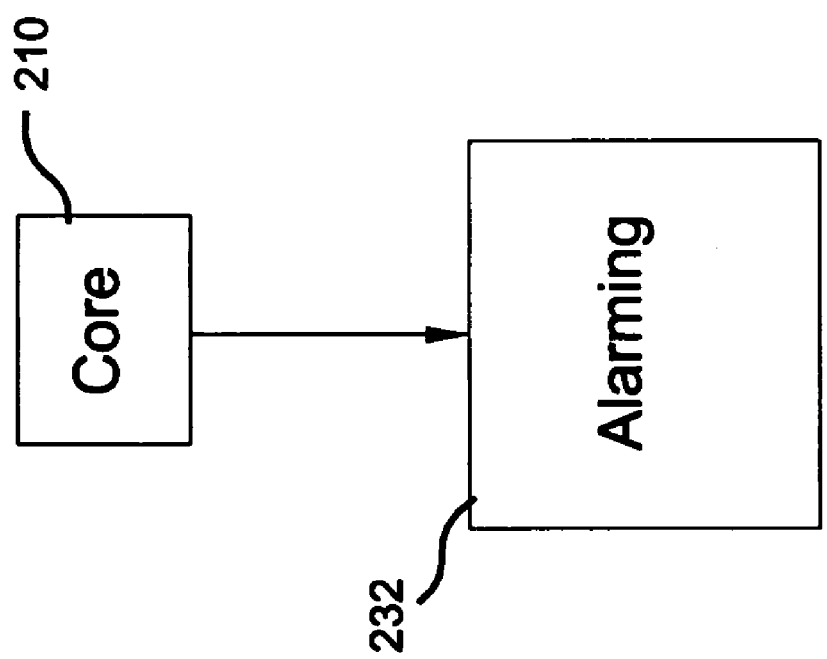
FIG. 16 is a schematic view of an alarming routine.
Figure 17:
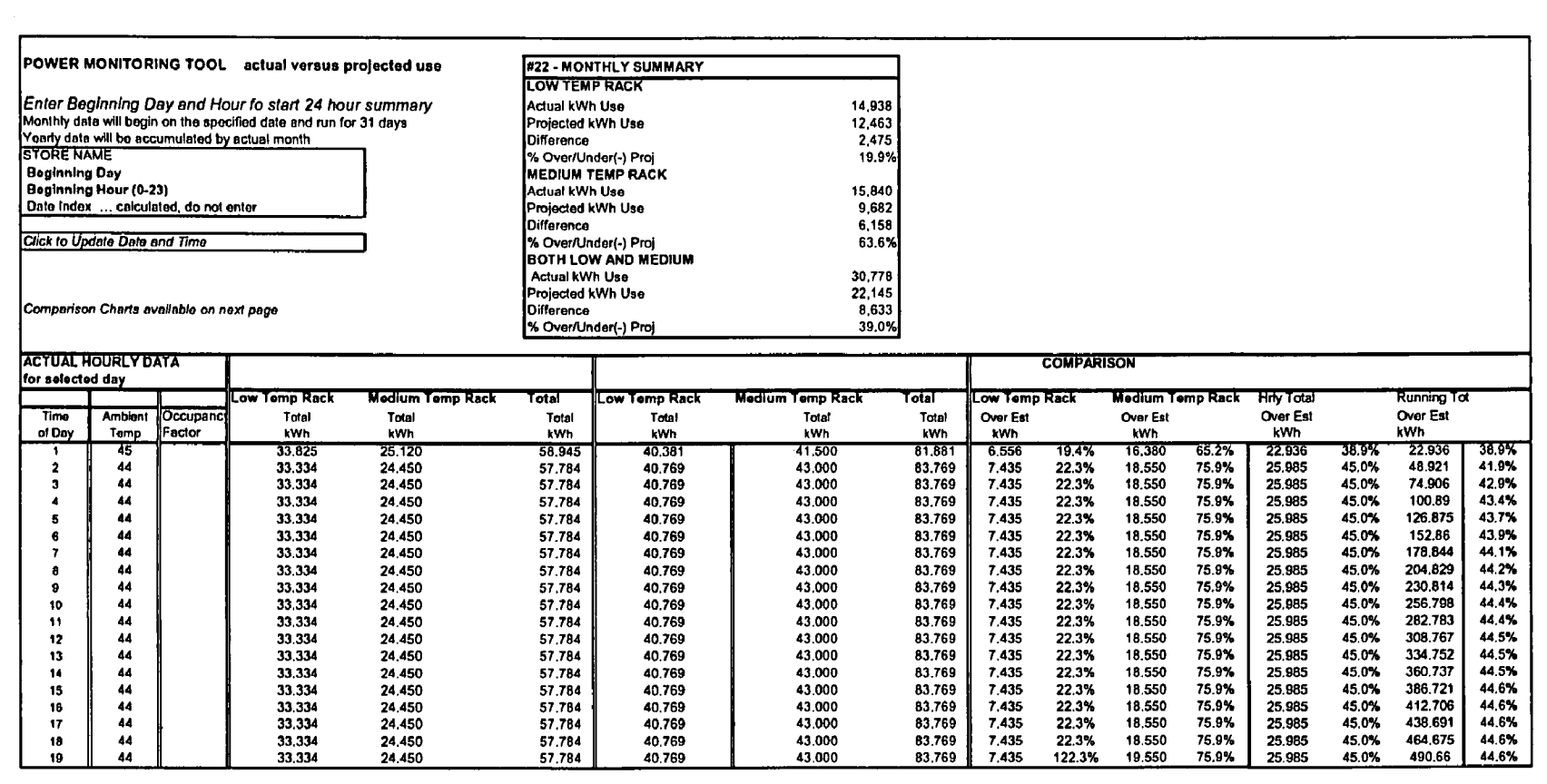

The efficiency block output includes two main tools: a power monitoring tool 230 and an alarming tool 232, shown schematically in FIGS. 15 and 16, respectively. The power monitoring tool 230 provides an evaluation of the equipment power usage as compared between a calculated value, from the core calculator 210, and the actual power usage, imported from actual site data. The power monitoring tool 230 receives inputs from the core calculator 210, actual site data 220, new site data 224 and its output is a function of operator selectable date, time and location. With reference to FIG. 17, a screen-shot is provided for the power monitoring tool 230. The input received from the core calculator 210 includes a value for the projected use, as referenced by ambient temperature. The actual site data 226 provides the power monitoring tool 230 with the ambient temperature for each hour of the particular day. The new site data 224 provides actual use information, which is manipulated by the power monitoring 230 tool to be summarized by hour, day and month. Using this information, the power monitoring tool 230 provides a summary per rack type, whereby the actual usage is compared to the projected usage and a difference is given. In this manner, the performance of the refrigeration system 100 of a particular remote location 14 may be evaluated for efficiency.

The alarming tool 232 is shown schematically in FIG. 16 and includes alarm limits for alerting a remote location 14 when equipment efficiencies fall below a particular limit. The alarming tool 232 may be implemented on-site, thereby readily providing an efficiency alert to initiate a quick correction action, as well as being implemented at the management center 12.

Figure 18:
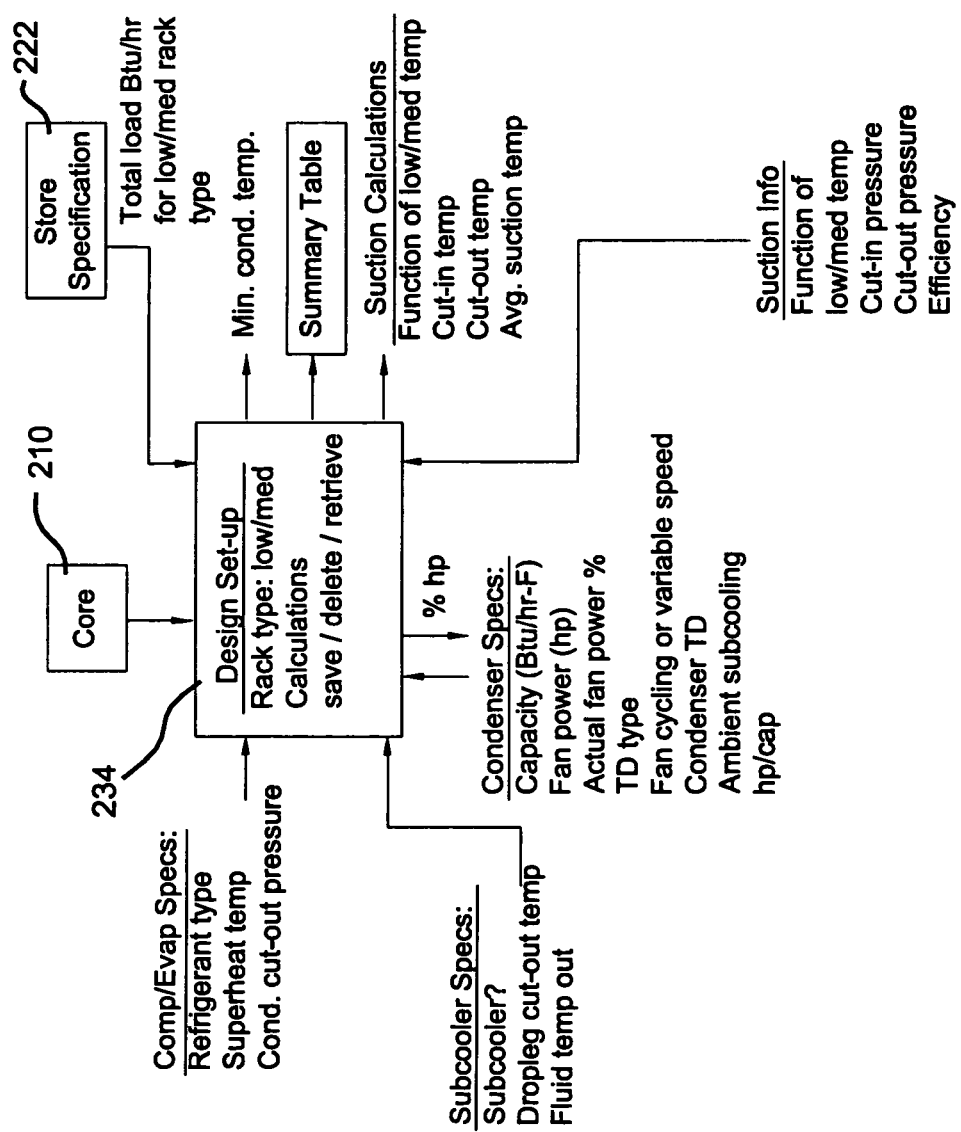
FIG. 18 is a schematic view of a design set-up routine.
Figure 19:
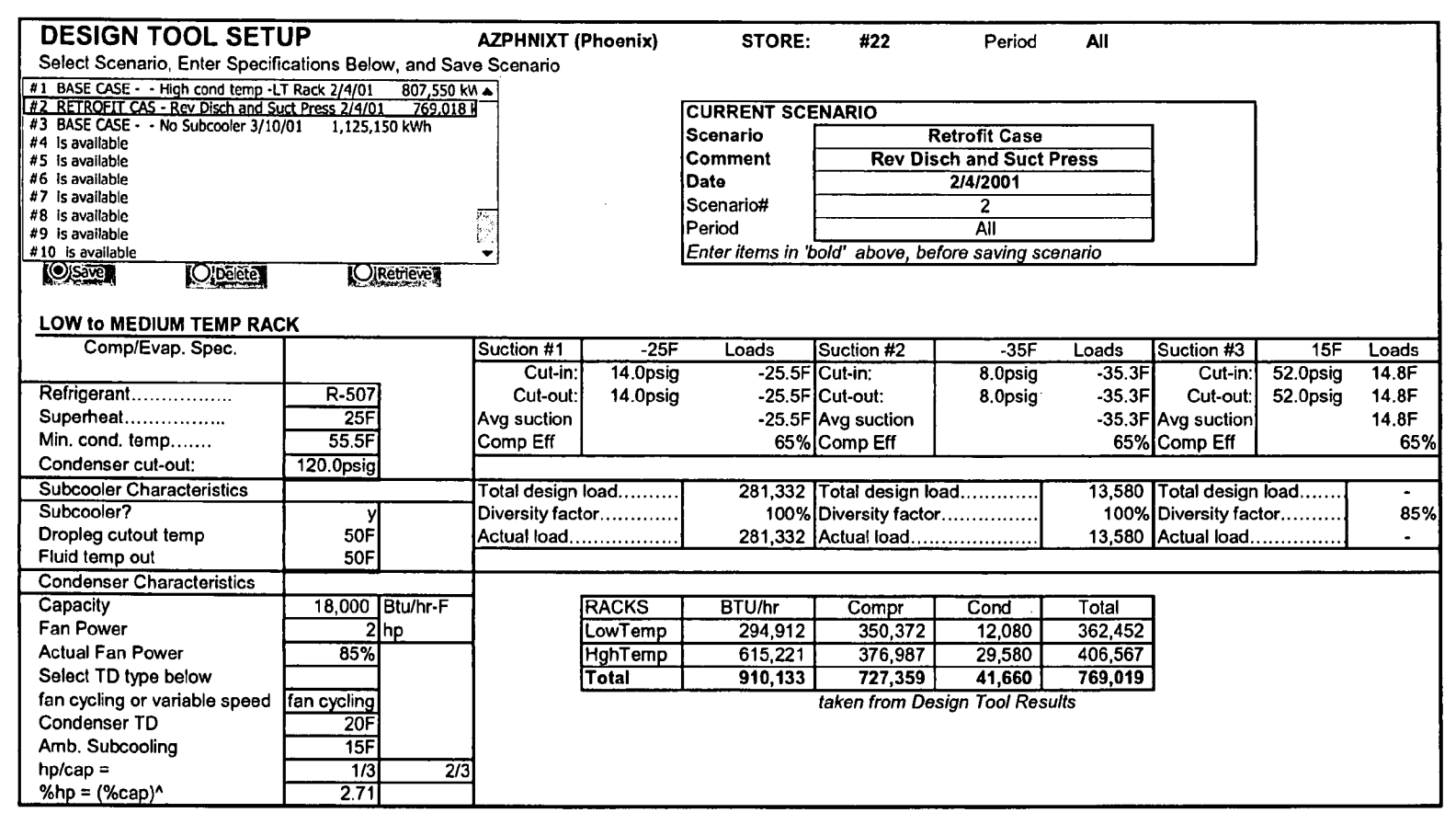

With further reference to FIG. 7, the design block output provides energy usage calculations based upon specific design scenarios and includes two components: a design set-up component 234 and a design results component 236. The design set-up component 234 interacts with the core calculator 210, providing the core calculator 210 with input information and receiving calculations therefrom. With reference to FIGS. 18 and 19, a screen-shot and a schematic view are respectively provided for the design set-up component 234. A user may input various design scenario information and is provided with a theoretical annual energy usage calculation.

The design set-up component 234 enables a user to input specific component and operation environment variables to evaluate any one of a number of possible operational scenarios. Each of these scenarios may be saved, deleted and retrieved, as a user desires. The user must input specification information for components such as a compressor, evaporator, sub-cooler, condenser and the like. With respect to the compressor and evaporator, inputs such as refrigerant type, superheat temperature and condenser cut-out pressure are required. The sub-cooler inputs include whether a sub-cooler is present, the dropleg cut-out temperature and fluid out temperature. The condenser inputs include the condenser capacity (BTU/hr–F), fan power (hp), actual fanpower (%), temperature difference type, whether fan cycling or variable speed, condenser temperature difference, ambient sub-cooling and HP capacity. The design set-up component 232 uses the horsepower capacity to determine a percent horsepower.

Suction information is also provided per rack type. This information includes cut-in pressure, cut-out pressure and efficiency. Further, the store specification component 222 provides the design set-up component 232 with the total load (BTU/hr) for each rack type of the specific location.

The design set-up component 232 provides a summary table, briefly summarizing the energy usage per rack type. The design set-up component 232 further calculates a minimum condenser temperature, and suction calculations including cut-in temperature, cut-out temperature and average suction temperature.

Figure 20:
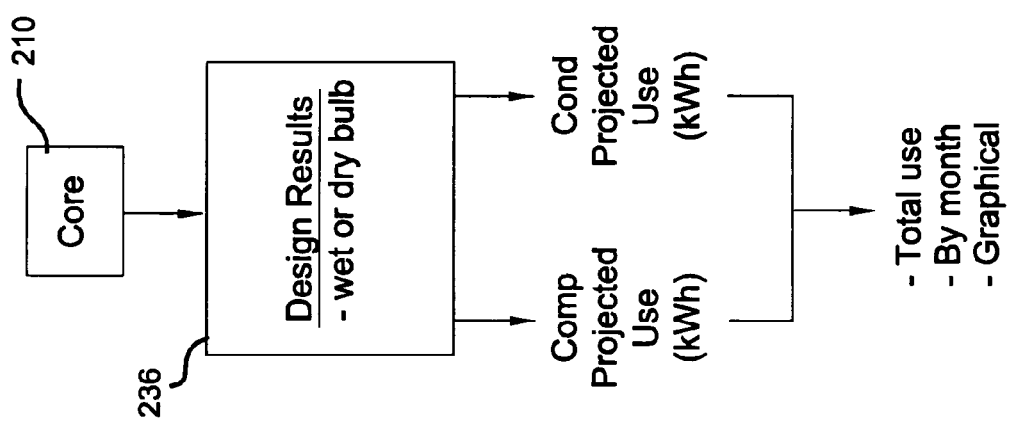
FIG. 20 is a schematic view of a design results routine.
Figure 21:
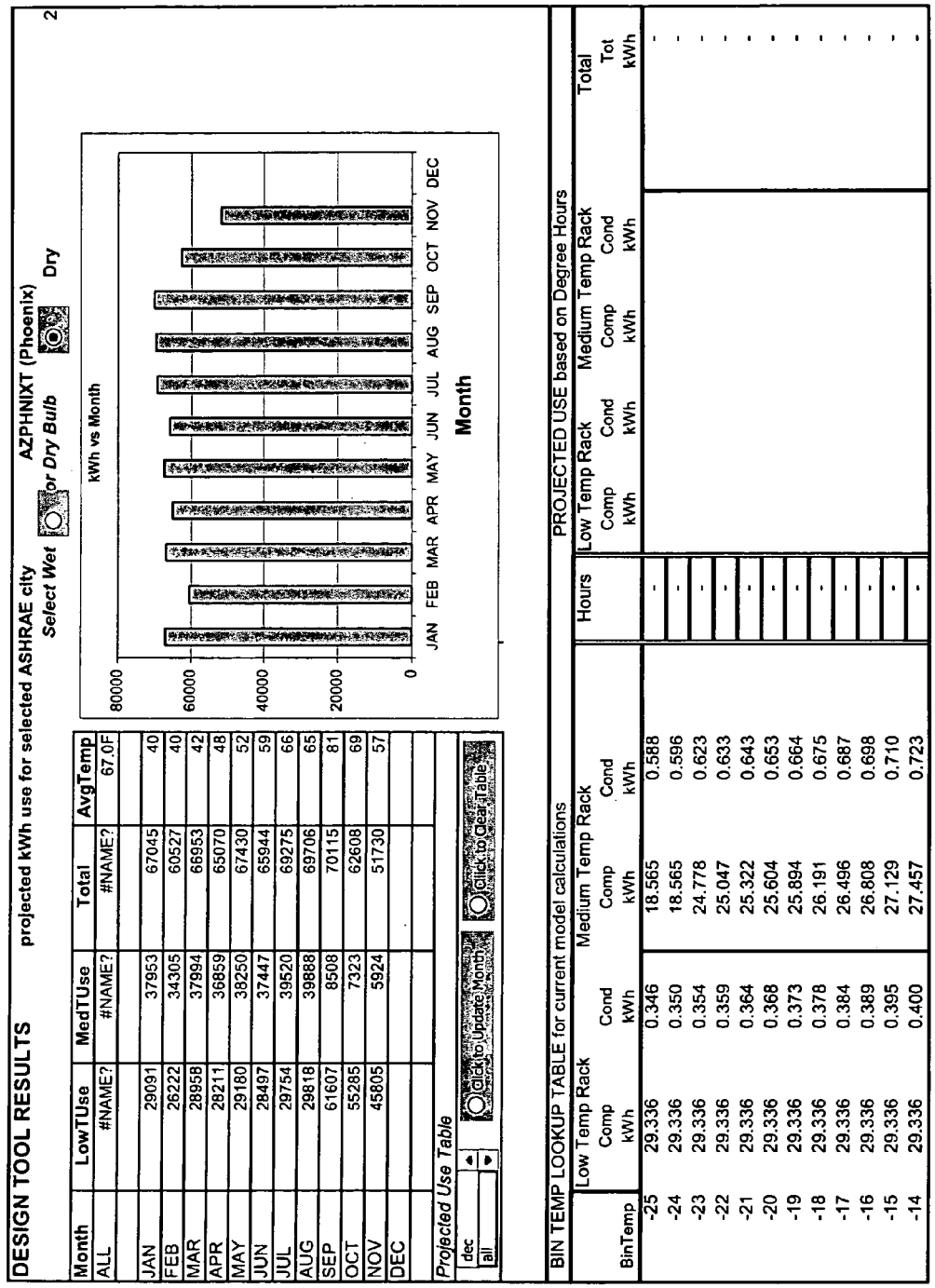
FIG. 21 is a screen-shot of the design results routine.

The design results component 234 provides a more detailed breakdown of the power usage. With reference to FIGS. 20 and 21, a screen-shot and a schematic view are respectively provided for the design results component 234. The design results component 234 provides output information as a function of whether temperature is measured by dry or wet bulb for the given remote location 14. The output information includes projected use in kWh for both the compressor and condenser. This information is further compiled into total use, by month, and displayed graphically.

Figure 22:
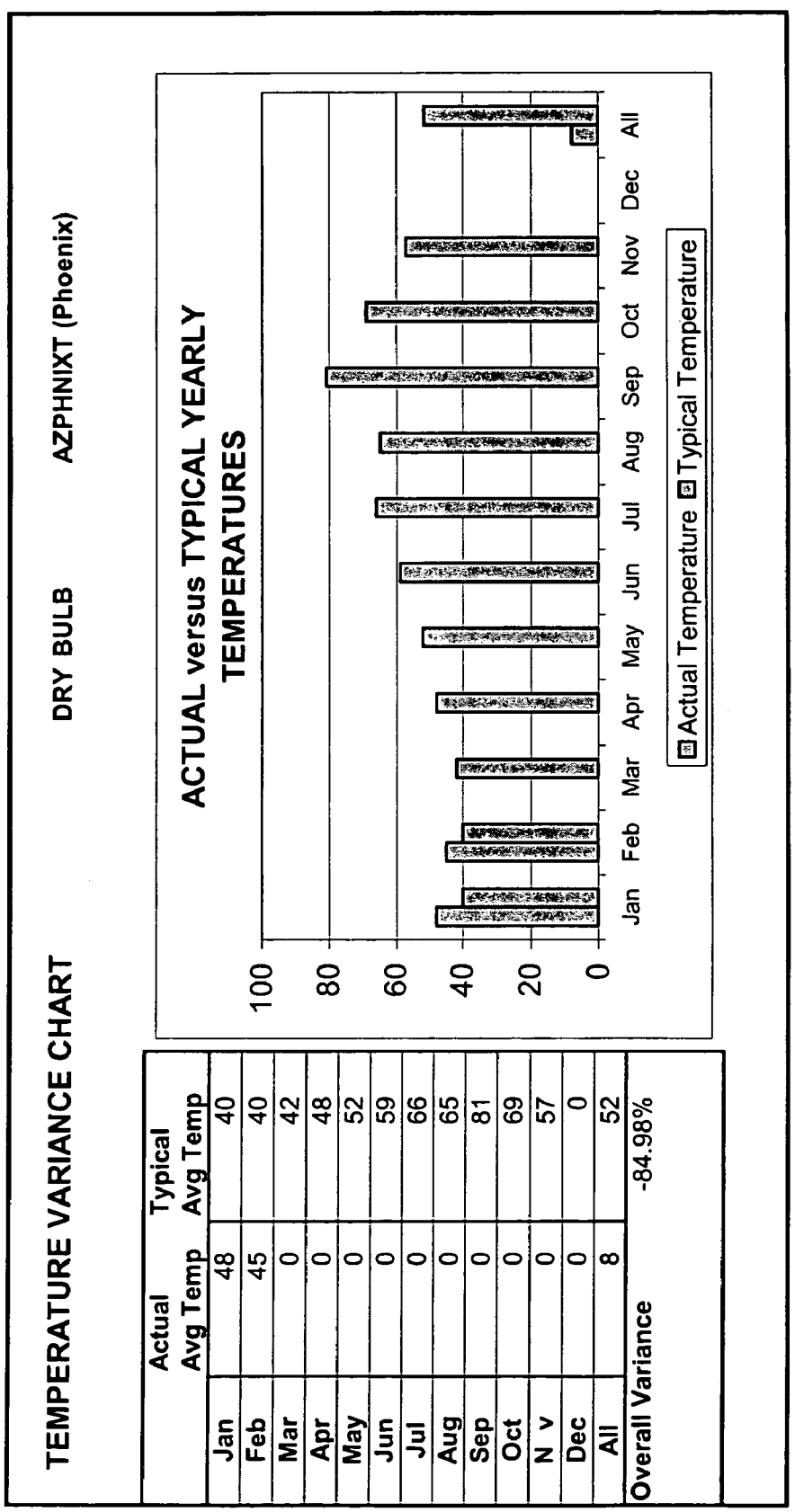
FIG. 22 is a screen-shot of a temperature variation routine.

Because many of the calculations are based upon the provided ASHRAE data, it is important to consider the actual temperatures experienced at a particular location versus the average temperature provided by the ASHRAE data. With reference to FIG. 22, a screen-shot is provided displaying a comparison between the actual average temperatures for a particular month versus typical (i.e., ASHRAE) average temperatures for the particular month. Considering this information, deviations between the projected energy usage and actual energy usage may be more thoroughly evaluated, thereby providing a better analysis of the operation of the refrigeration system 100.

Figure 23:
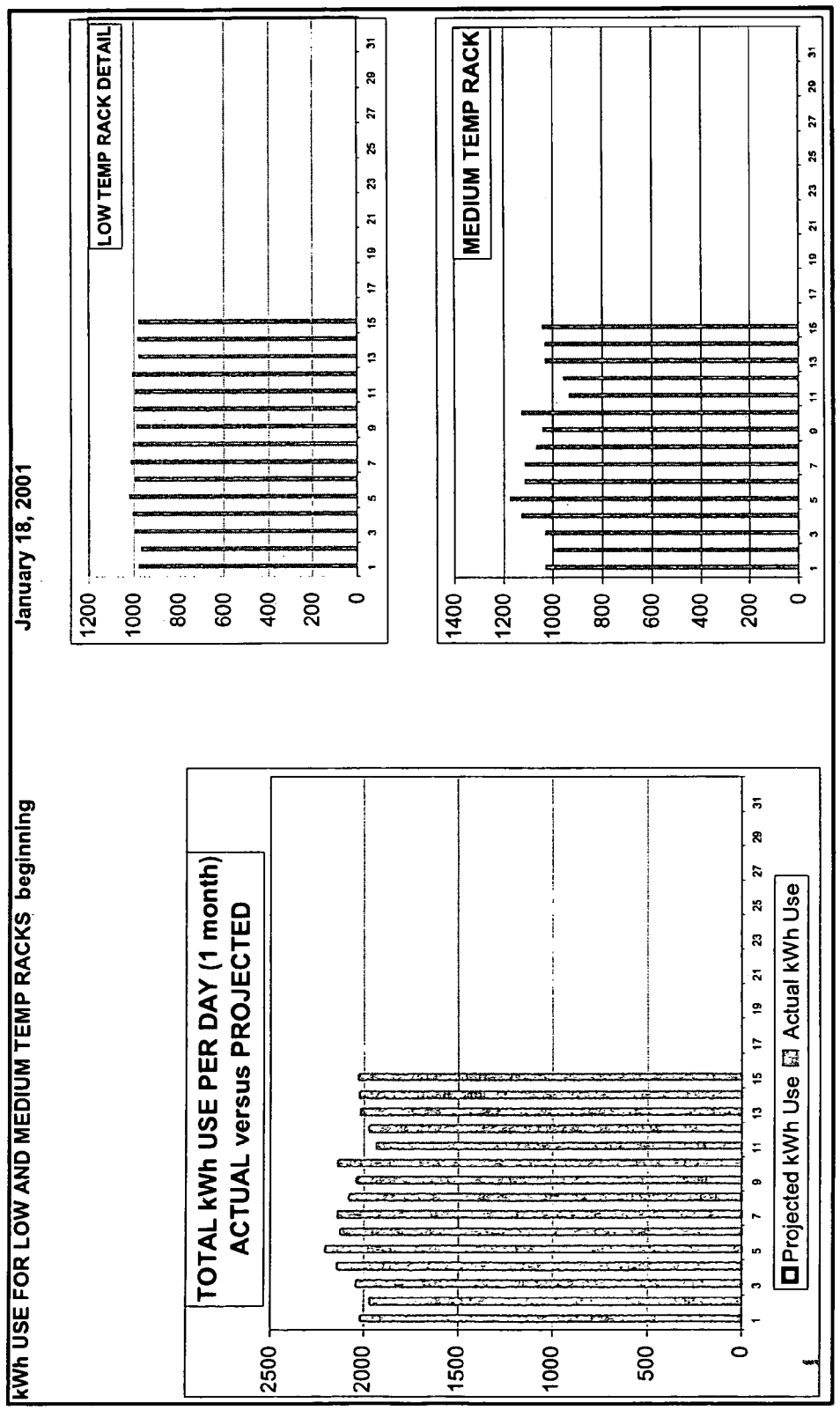
FIG. 23 is a screen-shot showing charts summarizing results of the energy usage algorithm.

With reference to FIG. 23, energy usage characteristics are summarized in tabular form. The total actual and projected energy usage for all rack types is provided on a daily basis for a particular month. Other tables breakdown the total by rack type. In this manner, energy usage performance may be quickly and easily summarized and evaluated for determining future operational activity.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for managing energy consumption of a building system at a first location, said system comprising:
   a source of actual energy consumption data;
   a source of actual weather data;
   a database associating discrete weather data values with expected energy consumption values for at least one component of the building system; and
   at least one computer accessing said actual weather data, said actual energy consumption data and said database, wherein said at least one computer correlates actual weather data with said discrete weather data to select at least one of said expected energy consumption values, and compares said at least one of said expected energy consumption values with said actual energy consumption data.

2. The system of claim 1 wherein said computer generates an output based on said comparison.

3. A method for managing energy consumption of a building system at a first location, said method comprising:
   receiving actual energy consumption data;
   receiving actual weather data;
   associating discrete weather data values with expected energy consumption values for at least one component of the building system;
   correlating said actual weather data with said discrete weather data values;
   selecting at least one of said expected energy consumption values based on said correlating;
   comparing said at least one of said expected energy consumption values with said received actual energy consumption data.

4. The method of claim 3 further comprising generating an output based on said comparing.

5. The system of claim 1 wherein said expected energy consumption values are generated for said discrete weather data values using an energy consumption model that functionally relates said discrete weather data values and design information for said at least one component of the building system.

6. The system of claim 2 wherein said output based on said comparison generates an alarm.

7. The system of claim 6 wherein said alarm is a local notification at the first location.

8. The system of claim 6 wherein said alarm is a remote notification at a second location remote from the first location.

9. The system of claim 1 wherein said at least one computer is at least one computer of the following group of computers: case controller, system controller, building system controller, building system server, in-store information system (ISIS), local area network (LAN) computer, wide area network (WAN) computer, third-party computer, processing center, management center.

10. The system of claim 1 wherein said computer is a local computer located at the first location.

11. The system of claim 1 wherein said computer is a remote computer located at a second location remote from the first location.

12. The system of claim 1 wherein said source of actual weather data is a sensor located at the first location.

13. The system of claim 1 wherein said source of actual weather data is a sensor located at a weather station near the first location.

14. The system of claim 1 wherein said source of actual energy consumption data is an energy meter in communication with said at least one component of the building system.

15. The method of claim 3 wherein said associating discrete weather data values with expected energy consumption values for at least one component of the building system includes generating a database using an energy consumption model that functionally relates said discrete weather data values and design information for said at least one component of the building system.

16. The system of claim 4 wherein said step of generating an output based on said comparing includes generating an alarm.

17. The method of claim 16 wherein said generating an alarm is a local notification at the first location.

18. The method of claim 16 wherein said generating an alarm is a remote notification at a second location remote from the first location.

19. The method of claim 3 wherein said selecting and comparing are performed by a computer.

20. The method of claim 19 wherein said computer is at least one computer of the following group of computers: case controller, system controller, building system controller, building system server, in-store information system (ISIS), local area network (LAN) computer, wide area network (WAN) computer, third-party computer, processing center, management center.

21. The method of claim 4 wherein said computer further performs associating and generating.

22. The method of claim 3 wherein said receiving actual weather data includes monitoring a sensor located at the first location.

23. The method of claim 3 wherein said receiving actual weather data includes monitoring a sensor located at a weather station near the first location.

24. The method of claim 3 wherein said receiving said actual energy consumption data includes monitoring an energy meter in communication with said at least one component of the building system.

* * * * *